United States Patent
Petersen et al.

(10) Patent No.: US 7,116,683 B1
(45) Date of Patent: Oct. 3, 2006

(54) SEQUENCING OF USER DATA PACKETS SEGMENTED INTO AAL2 PACKETS TRANSPORTED OVER INTERNET PROTOCOL (IP)

(75) Inventors: Lars-Göran Petersen, Tumba (SE); David Comstock, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 895 days.

(21) Appl. No.: 09/716,440

(22) Filed: Nov. 21, 2000

(51) Int. Cl.
  *H04L 12/66* (2006.01)
  *H04L 12/28* (2006.01)
  *H04J 3/24* (2006.01)
(52) U.S. Cl. .................. 370/474; 370/395.64; 370/352
(58) Field of Classification Search .......... 370/395.1, 370/395.6, 389, 465, 469, 392, 473, 395.61, 370/395.63, 395.64, 474, 470, 471
See application file for complete search history.

(56) References Cited

U.S. PATENT DOCUMENTS

| | | | |
|---|---|---|---|
| 4,635,379 A | | 1/1987 | Kroneld |
| 4,656,955 A | | 4/1987 | Kuo |
| 5,822,321 A | | 10/1998 | Petersen et al. |
| 5,946,313 A | * | 8/1999 | Allan et al. .................. 370/397 |
| 6,075,798 A | * | 6/2000 | Lyons et al. .................. 370/474 |
| 6,396,853 B1 | * | 5/2002 | Humphrey et al. ......... 370/535 |
| 6,438,131 B1 | * | 8/2002 | Gerber et al. .......... 370/395.61 |
| 6,574,224 B1 | * | 6/2003 | Brueckheimer et al. . 370/395.6 |
| 6,574,226 B1 | * | 6/2003 | Nakano et al. ........ 370/395.64 |
| 6,711,126 B1 | * | 3/2004 | Besset-Bathias ............ 370/229 |
| 6,717,948 B1 | * | 4/2004 | Subbiah .................. 370/395.64 |
| 6,728,261 B1 | * | 4/2004 | Sasson et al. ............... 370/466 |
| 6,731,649 B1 | * | 5/2004 | Silverman ................... 370/466 |
| 6,925,096 B1 | * | 8/2005 | Haartsen ..................... 370/473 |

FOREIGN PATENT DOCUMENTS

| | | |
|---|---|---|
| DE | 198 45 031 A1 | 4/2000 |
| EP | 0 700 231 A2 | 3/1996 |
| WO | 97/38550 | 10/1997 |
| WO | 97/48251 | 12/1997 |
| WO | 98/18286 | 4/1998 |
| WO | 99/13679 A2 | 3/1999 |
| WO | 99/33314 | 7/1999 |
| WO | 99/33315 | 7/1999 |

OTHER PUBLICATIONS

International Preliminary Examination Report mailed Jan. 17, 2003 in corresponding PCT Application PCT/SE01/02529.

(Continued)

*Primary Examiner*—Hanh Nguyen
(74) *Attorney, Agent, or Firm*—Nixon & Vanderhye, P.C.

(57) ABSTRACT

Techniques are provided for sequencing user data packets (e.g., voice packets) segmented into plural AAL2 packets which are in turn carried over Internet Protocol (IP). Concerning segmented user data packets, the techniques of the present invention utilize one or more predetermined values in the length indicator (LI) field in the headers of the certain ones of the plural AAL2 packets to carry information other than packet size information. Further, the techniques of the present invention use the User-to-User indicator (UUI) field of the AAL2 packets to carry AAL2 information such as segmentation notification and sequence-derivable information. For AAL2 packets which carry non-segmented user data packets (e.g., user data packets which can fit with the maximum size of a single AAL2 packet), the length indicator (LI) field contains the actual length of the AAL2 packet in conventional manner.

88 Claims, 13 Drawing Sheets

OTHER PUBLICATIONS

Patent Abstracts of Japan, Nov. 30, 1999, 11-331206 A, (KDD CORP) XP002199894.
International Search Report mailed May 29, 2002.
"B-ISDN ATM Adaptation Layer Specification: Type 2 AAL", ITU-T Recommendation I.363.2, Sep. 1997.
"Segmentation and Reassembly Service Specific Convergence Sublayer For The AAL2 Type 2", ITU-T Recommendation I.366.1, Jun. 1998.
U.S. Appl. No. 60/181,083, filed Feb. 8, 2000, entitled Using Internet Protocol (IP) in Radio Access Network.

* cited by examiner

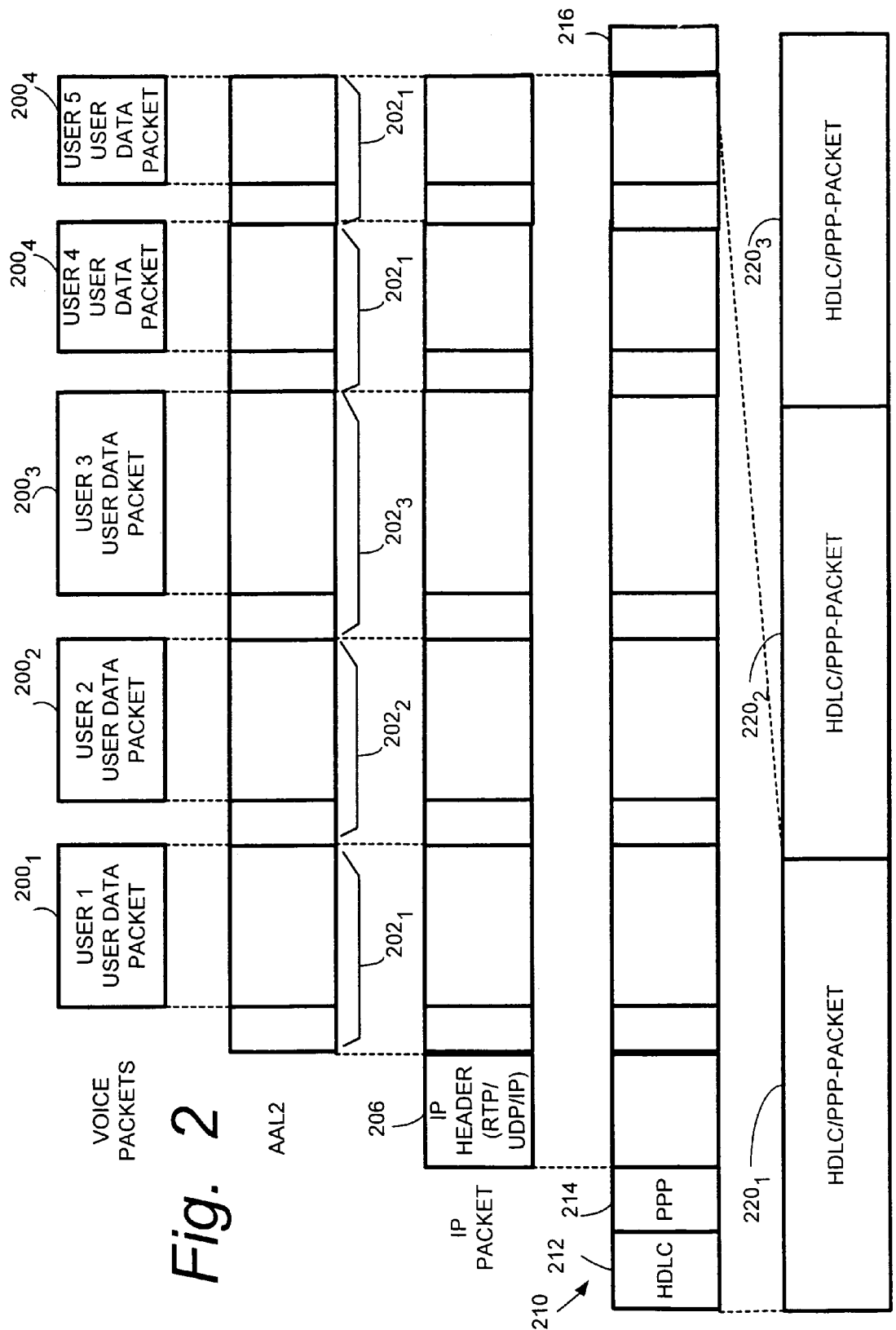

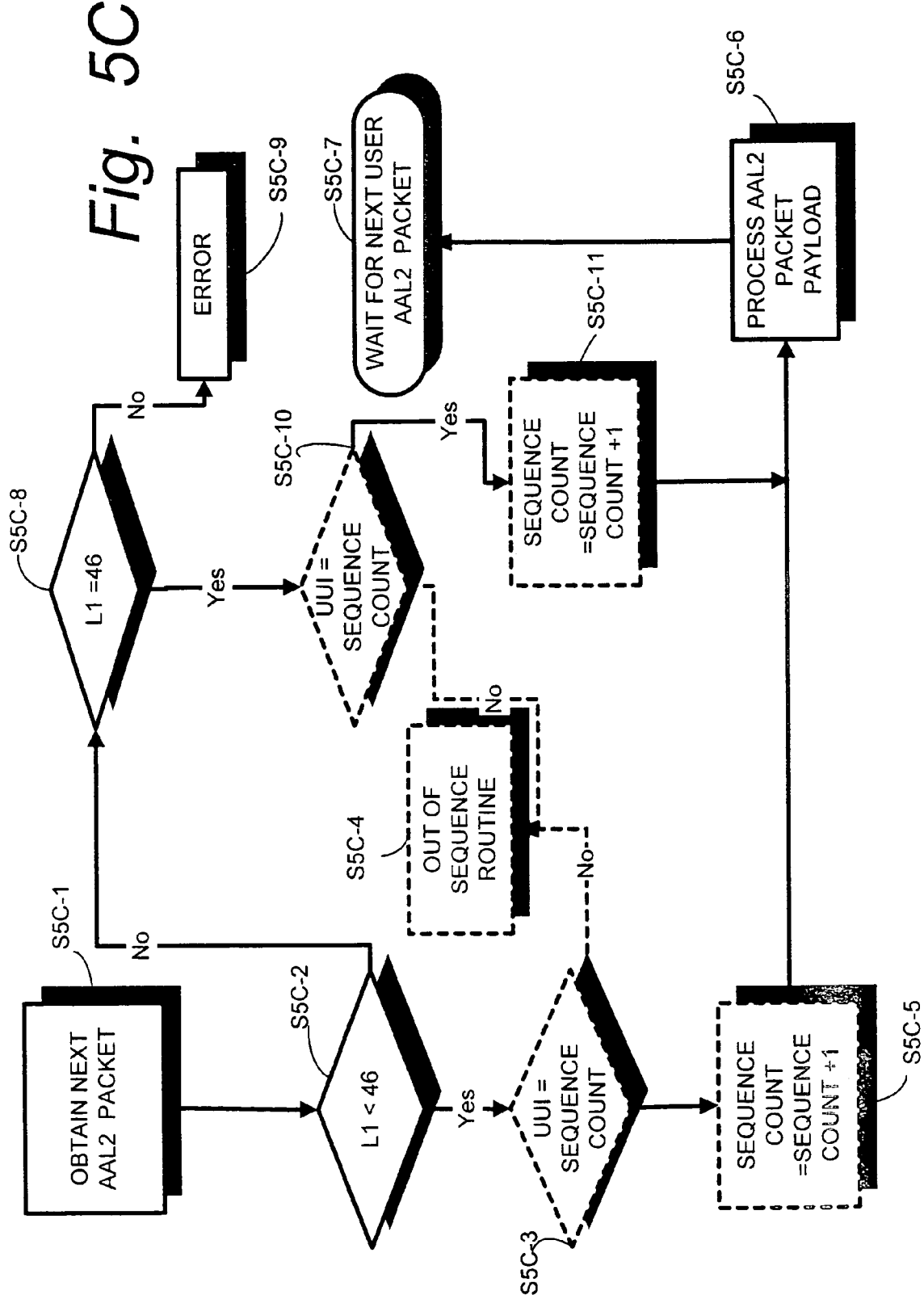

SEQUENCING OF USER DATA PACKETS SEGMENTED INTO AAL2 PACKETS TRANSPORTED OVER INTERNET PROTOCOL (IP)

FIELD OF THE INVENTION

The present invention pertains to data communications, and particularly to the sequencing of user data packets such as voice data packets segmented into other protocol packets (such as AAL2 packets) which are carried on Internet Protocol (IP).

BACKGROUND AND SUMMARY OF THE INVENTION

Asynchronous Transfer Mode (ATM) is becoming increasingly used in communication networks. ATM is a packet-oriented transfer mode which uses asynchronous time division multiplexing techniques. Packets are called cells and have a fixed size. An ATM cell consists of 53 octets, five of which form a header and forty eight of which constitute a "payload" or information portion of the cell. The header of the ATM cell includes two quantities which are used to identify a connection in an ATM network over which the cell is to travel, particularly the VPI (Virtual Path Identifier) and VCI (Virtual Channel Identifier). In general, the virtual path is a principal path defined between two switching nodes of the network; the virtual channel is one specific connection on the respective principal path.

A protocol reference model has been developed for illustrating layering of ATM. The protocol reference model layers include (from lower to higher layers) a physical layer (including both a physical medium sublayer and a transmission convergence sublayer), an ATM layer, and an ATM adaptation layer (AAL), and higher layers. The basic purpose of the AAL layer is to isolate the higher layers from specific characteristics of the ATM layer by mapping the higher-layer protocol data units (PDU) into the information field of the ATM cell and vise versa. There are several differing AAL types or categories, including AAL0, AAL1, AAL2, AAL3/4, and AAL5. Yet another AAL type, known as AAL2 prime, is described in the following (all of which are incorporated herein by reference: U.S. patent application Ser. No. 09/188,102, filed Nov. 9, 1998; U.S. patent application Ser. No. 09/188,347, filed Nov. 9, 1998; and International Patent Application Number PCT/SE98/02250 (WO 99/33315, published Jul. 1, 1999).

One purpose of AAL2 is to handle compressed voice data in more bandwidth efficiently. AAL2 is a standard defined by B-ISDN ATM Adaptation Layer Specification: Type 2 AAL ITU-TRecommendation I.363.2. An AAL2 packet comprises a three octet packet header, as well as a packet payload. The AAL2 packet header includes an eight bit channel identifier (CID), a six bit length indicator (LI), a five bit User-to-User indicator (UUI), and five bits of header error control (HEC). The AAL2 packet payload, which carries user data, can vary from one to forty-five octets.

Up to 248 AAL2 channels can be multiplexed on an ATM connection. The channel identifier (CID) is used to identify the channels. The length indicator (LI) is binary encoded plus one to the payload length. The User-to-User indicator (UUI) is a field that is conveyed transparently between endpoints. The User-to-User indicator (UUI) has been used for sequence numbering for other services besides segmentation, as described in AAL ITU-T Recommendation I.366.2. However, the previous uses of the UUI field for sequence numbering has not occurred in a segmentation and reassembly context.

An AAL2 packet can overlap an ATM cell boundary and continue in the remainder of the next ATM cell. Thus, AAL2 packet payloads as carried in ATM cells can be segmented, as prescribed (for example) by the document entitled Segmentation and Reassembly Service Specific Convergence Sublayer For The AAL2 Type 2: ITU-T Recommendation I.366.1. This segmentation of AAL2 packet payloads is particularly facilitated by the fact that the first octet in the payload of every ATM cell contains a start field (STF). The start field (STF) contains a modulo 2 sequence counter named SN, which specifies or points to the location of the first AAL2 packet header within the ATM cell payload. The purpose of the start field (STF) is to provide easy resynchronization at the receiving side if the AAL2 packet boundary is lost. Normally, the receiving side finds the boundaries by the length indicator (LI), which indicates the start of the next AAL2 packet.

Other methods for segmentation are described in the following documents: PCT/SE97/00570 [WO 97/38550], entitled MINICELL SEGEMTATION AND REASSEMBLY; and PCT/SE97/00972 [WO 97/48251], entitled MULTIPLEXING OF VOICE AND DATA MINICELLS.

Thus, in the prior art, data packets (e.g., compressed voice packets) are carried in payloads of AAL2 packets, with one or more AAL2 packets (either whole or in part [e.g., segmented]) being carried in ATM cells. With ATM transport, sequencing information is unnecessary user data packets are segmented, since ATM is connection oriented.

In the context of the current invention, by contrast, user data packets belonging to a higher layer (e.g., voice packets) are carried by AAL2 packets, with the AAL2 packets (or segments thereof) being multiplexed into the payload of Internet Protocol (IP) packets. The IP packets can be UDP/Ipv4 or UDP/Ipv6 packet format, with or without RTP, with compressed header or not compressed header. Any underlying transport bearer, e.g., PPP/HDLC, AAL5/ATM may apply since it is in the IP paradigm that it can be carried on all sorts of bearers. See, for example, Swedish patent application SE-9903982(-8), and PCT patent application PCT/SE00/02089, both of which are incorporated herein by reference.

There is a need for segmentation of data packets (e.g., voice packets) having a length longer than 45 octets (45 octets being the length of the payload of the standard AAL2 packet). The need exists when the AAL2 packets are carried in the payload of an IP packet. Since Internet Protocol (IP) packets can be reordered in the network, sequencing information is important for such segmentation.

The present invention fulfills this need by providing techniques for segmenting user data packets (e.g., voice packets) carried in AAL2 packets, and for sequencing those AAL2 packets as the AAL2 packets are carried over Internet Protocol (IP). Concerning segmented user data packets, the techniques of the present invention utilize one or more predetermined values in the length indicator (LI) field in the headers of the certain ones of the plural AAL2 packets to carry information other than packet size information. Further, the techniques of the present invention use the User-to-User indicator (UUI) field of the AAL2 packets to carry AAL2 information such as segmentation notification or sequence-derivable information. For AAL2 packets which carry non-segmented user data packets (e.g., user data packets which can fit with the maximum size of a single AAL2 packet) and for the last segment of a segmented frame, the length indicator (LI) field contains the actual length of the AAL2 packet in conventional manner.

In a first mode of the invention, when a user data packet payload is spread or segmented over plural AAL2 packets, values related and thus corresponding to sequence numbers for the AAL2 packets (which carry the segmented user data packets) are stored in the length indicator (LI) field of all but the last of the plural AAL2 packets utilized by the segmented user data packet. To facilitate this first mode, a range of values are reserved for the length indicator (LI) field. In one illustrated implementation, the range of reserved or predetermined values extends between 48 and 63, inclusive of both 48 and 63. Thus, the range of predetermined or reserved values comprises numbers which are greater than a maximum number of octets in a standard size AAL2 packet. In addition, in this first mode of the invention, the User-to-User indicator (UUI) field of all but the last of the AAL2 packets accommodating segmented user data packets contains a preselected value, the preselected value serving as a notification (1) that the AAL2 packet is not the last AAL2 packet serving the user data packet, and (2) that other AAL2 packets for the same user data packet are to be expected. In one illustrated implementation of this first mode, this continuation notification preselected value for the User-to-User indicator (UUI) field is 27.

Therefore, in the first mode, when an AAL2 packet is detected before reassembly as having a value in the reserved range (e.g., from 48 to 63 inclusive), that AAL2 packet is recognized as serving a segmented user data packet, and having a sequence number which is derived from the value in the length indicator (LI) field. A modulo division of the predetermined value in the length indicator (LI) field provides the sequence number for the AAL2 packet.

A last AAL2 packet of the plural AAL2 packets accommodating the segmented user data packet is detectable in the first mode, since it has in its length indicator field a value not greater than the maximum number of octets in a standard size AAL2 packet. Moreover, the contents of the User-to-User indicator (UUI) field of such a last AAL2 packet can be used to confirm that the last AAL2 packet is in a proper sequence.

The second mode of the invention resembles the first mode in that, when a user data packet payload is spread or segmented over plural AAL2 packets, the sequence number-related values for the AAL2 packets (which carry the segmented user data packets) are stored in the length indicator (LI) field of the plural AAL2 packets utilized by the segmented user data packet. To facilitate this second mode, two ranges of values are reserved for the length indicator (LI) field. In one illustrated implementation, the first range of reserved or predetermined values extends between 48 and 55, inclusive of both 48 and 55, while the second range of reserved or predetermined values extends between 56 and 63, inclusive of both 56 and 63. When the length indicator (LI) field of a received AAL2 packet belongs to the first range, the received AAL2 packet is recognized as being for a first of the plural AAL2 packets containing the user data of the user data frame. When the length indicator (LI) field of a received AAL2 packet belongs to the second range, the received AAL2 packet is recognized as being other than the first of the plural AAL2 packets (e.g., a second, third, fourth AAL2 packet, etc.).

In the second mode of the invention, a last AAL2 packet of the plural AAL2 packets has a predetermined end-of-user data packet value (e.g., zero) in its user-to-user indication (UUI) field of its header, and thus serves to mark reception of the end of the user data packet. The second mode has provision for determining loss of the last AAL2 packet containing the last segment (e.g., end) of a user data packet. If, in the second mode, a last AAL2 packet containing the last segment (e.g., end) of a user data packet is lost, such loss will be ascertained upon next encountering a new AAL2 packet having a first range value in its length indicator (LI) field or a value in the User-to-User indicator (UUI) field in the normal range (1 to 26 inclusive). That is, while looking for such an AAL2 packet containing the last segment of a user data packet, before encountering an AAL2 packet with the predetermined end-of-user data packet value the reassembly subunit RSU will encounter either: (1) a new AAL2 packet having a first range value in its length indicator (LI) field; or (2) an AAL2 packet having its contents in the normal range.

In a third mode of the invention, the predetermined value in the length indicator (LI) field serves as a notification that another AAL2 packet of the plural AAL2 packets carries subsequent data belonging to the frame. As in the other modes, the predetermined value is a value greater than a maximum number of octets in a standard size AAL2 packet. In one example illustrative embodiment, the predetermined value is 46. In this third mode, a last AAL2 packet of the plural AAL2 packets is detected by having in its length indicator field a value not greater than the maximum number of octets in a standard size AAL2 packet. The third mode frees the user-to-user indication (UUI) field in the header of the AAL2 packets, so that the user-to-user indication (UUI) field can serve for other purposes such as sequence number, for example.

One example, non-limiting deployment of any of the modes of the present invention is in the context of a universal mobile telecommunications system (UMTS).

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 2 is a diagrammatic view showing multiplexing of AAL2 packets into an Internet Protocol (IP) packet, with no segmentation of user data packets.

FIG. 5C is a flowchart showing general steps involved in the reassembly of user packets from AAL2 packets in accordance with the third mode of the present invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
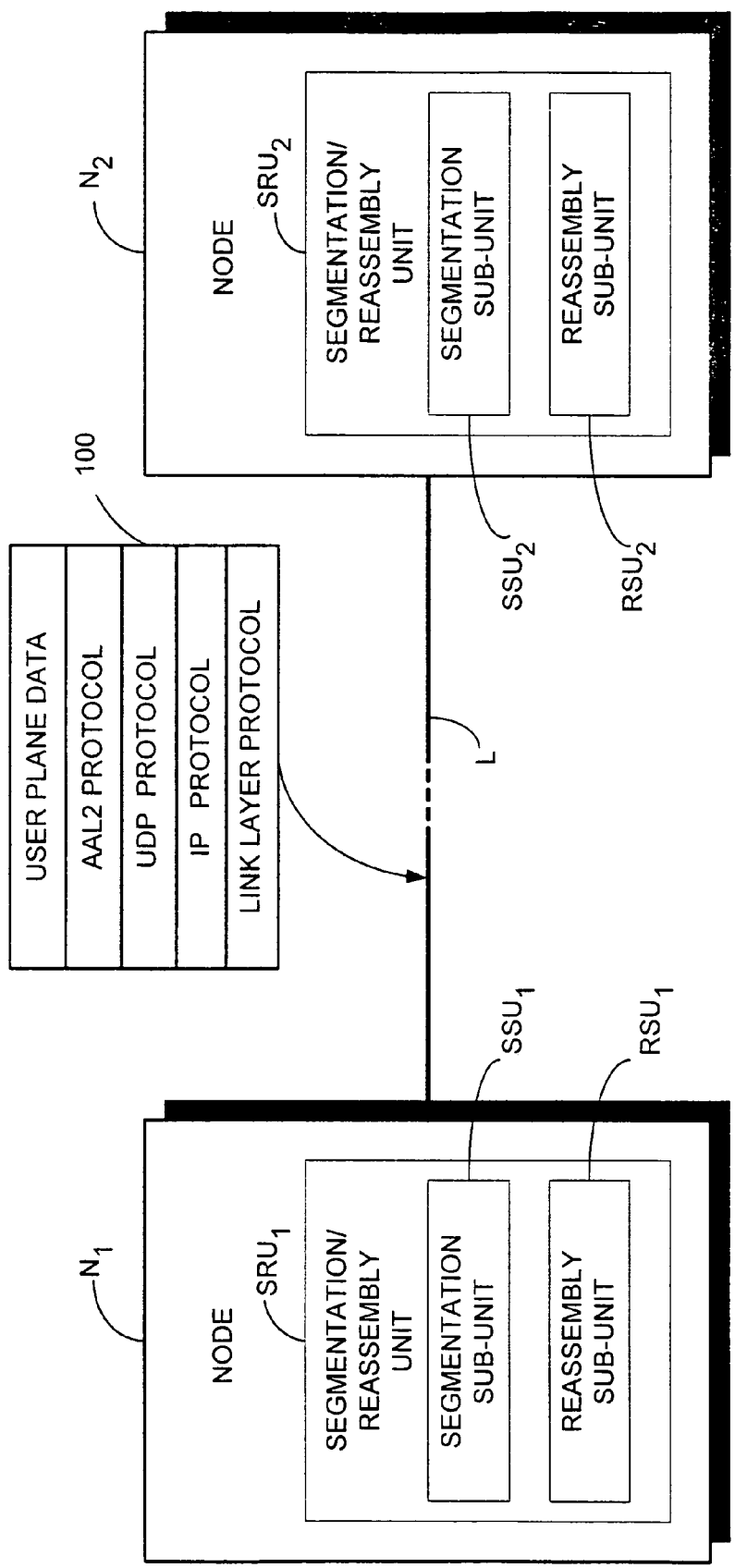
FIG. 1 is a schematic view showing two Internet Protocol (IP) host nodes at which segmentation and reassembly occur in accordance with the present invention.

FIG. 1 shows two data communication nodes $N_1$ and $N_2$ which are connected by physical transport means L. The physical transport means L can comprise any suitable transmission media, such as one or more links, one or more switches, one or more routers, and any combination(s) of the foregoing. Of importance to the present invention is the fact that the user plane protocol stack over physical transport means L, illustrated as user plane protocol stack 100 in FIG. 1, has user plane data packets or frames which are transported in AAL2 packets, with the AAL2 packets in turn being transported in Internet Protocol (IP) packets (e.g., IP/UDP/RTP packets), as hereinafter described in more detail, e.g., in connection with FIG. 2. As also subsequently explained, with reference, e.g., to FIG. 3A, FIG. 4A, and FIG. 5A, some of the user plane data packets or frames are of sufficient size that they must be segmented or distributed over plural AAL2 packets. Any underlying transport bearer, e.g., PPP/HDLC, AAL5/ATM may be used for the link layer protocol.

Each of the nodes $N_1$ and $N_2$ includes a segmentation/reassembly unit (SRU), segmentation/reassembly unit $SRU_1$ and segmentation/reassembly unit $SRU_2$ being shown for respective nodes $N_1$ and $N_2$. In segmentation/reassembly unit $SRU_1$ and segmentation/reassembly unit $SRU_2$, segmentation/reassembly is performed as part of an application above an Internet Protocol (IP) host in the respective nodes $N_1$ and $N_2$. Each segmentation/reassembly unit SRU comprises a segmentation subunit SSU and a reassembly subunit RSU. The segmentation subunit SSU of each node serves, e.g., to map user data packets or frames into AAL2 packets in a manner suitable to implement the user plane protocol stack 100 in the course of preparing packets for application to the physical transport means L (e.g., in preparation for transmission to another node). Conversely, the reassembly subunit RSU of each node serves, e.g., to reassembly user data packets or frames from AAL2 packets which are received (in the context of the user plane protocol stack 100) over physical transport means L from another node.

For sake of simplicity and clarity of illustration, only two nodes $N_1$ and $N_2$ are shown in FIG. 1. The person skilled in the art will appreciate that, in accordance with the present invention, a node can be receiving/sending streams of packets from/to many nodes.

As employed herein, the user data packets or frames can be data packets or frames for any suitable application, such as voice data packets, web traffic, email, or any other type of data traffic, for example. For sake of convenience, the terms user data packets and user data frames are used interchangeably herein.

As indicated above, in accordance with the present invention, user data packets belonging to a higher layer (e.g., voice packets) are carried by AAL2 packets, with the AAL2 packets (or segments thereof) being multiplexed into the payload of Internet Protocol (IP) packets. The composition of some of the Internet Protocol (IP) packets is illustrated in FIG. 2.

In the scenario shown in FIG. 2, each user data packet is put in a corresponding AAL2 packet. In the example illustration of FIG. 2, each user data packet $200_1$–$200_5$ (e.g., each of the compressed voice packets from users 1–5) is put in the payload of a corresponding AAL2 packet $202_1$–$202_5$, respectively. In the scenario of FIG. 2, all of the AAL2 packets $202_1$–$202_5$ are then put in the payload of an Internet Protocol (IP) packet 204. The Internet Protocol (IP) packet 204 has a header 206, which can be a RTP/UDP/IP header or a UDP/IP header. The Internet Protocol (IP) packet can be in the UDP/Ipv4 or UDP/Ipv6 packet format, with or without RTP, with compressed header or not compressed header. The Internet Protocol (IP) packet 204 is, in turn, put in a link layer protocol packet, which in the example illustration of FIG. 2 is a HDLC/PPP packet 210. The HDLC/PPP packet 210 has a HDLC header 212, a PPP header 214, and a HDLC trailer 216. The physical transport means L has plural HDLC/PPP packets 210 multiplexed thereon, as depicted by packet flow 220 in FIG. 2.

In the technique of putting AAL2 packets in an Internet Protocol (IP) packet such as packet 204, there is no need for a start field (STF) in the AAL2 packets since the UDP/IP packet payload (e.g., the payload of Internet Protocol (IP) packet 204) contains a set of whole AAL2 packets. This is facilitated by the fact that the Internet Protocol (IP) packet 204 payload is variable at octet boundaries. Using the technique of putting user data-carrying AAL2 packets in Internet Protocol (IP) packets in the manner described with reference to FIG. 2 (and also as subsequently described herein), the ratio between the overhead and payload is more favorable than in a prior art situation of multiplexing AAL2 packets on an ATM connection, and better than creating a separate UDP/IP packet for channel. Instead of introducing a new full UDP/IP packet header, only the AAL2 packet header is inserted between user data packet (e.g., voice packet) boundaries. The AAL2 packet header contains the needed channel identifier (CID) to distinguish the different calls [channels], and the length indicator (LI) which indicates the start of the next AAL2 packet. The foregoing is explained in more detail in Swedish patent application SE-9903982(-8), and PCT patent application PCT/SE00/02089.

FIG. 2 thus shows the multiplexing of AAL2 packets into an Internet Protocol (IP) packet, but in a scenario with no segmentation of user data packets as the user data packets are put in to a corresponding AAL2 packet segmentation. Advantageously, the present invention also caters to the situation in which user data packets are segmented into plural AAL2 packets, as described in more detail below.

The present invention provides techniques for segmenting user data packets (e.g., compressed voice packets) carried in AAL2 packets, and for sequencing those AAL2 packets as the AAL2 packets are carried over Internet Protocol (IP). Concerning segmented user data packets, the techniques of the present invention utilize one or more predetermined values in the length indicator (LI) field in the headers of the AAL2 packets to carry information other than packet size information. Further, the techniques of the present invention optionally use the User-to-User indicator (UUI) field of the AAL2 packets to carry AAL2 information such as segmentation notification or sequence-derivable information. For AAL2 packets which carry non-segmented user data packets (e.g., user data packets which can fit with the maximum size of a single AAL2 packet), the length indicator (LI) field contains the actual length of the AAL2 packet in conventional manner.

Three modes or techniques of implementing the present invention are hereinafter described. These three modes are not meant to be limiting illustrations of the concepts of the present invention, but rather only representative examples. For each of the three modes there is a strategy diagram, a flowchart showing selected basic steps performed by a segmentation subunit SSU for the mode, and a flowchart showing selected basic steps performed by a reassembly subunit RSU for the mode.

It should be further understood that the basic steps illustrated by the flowcharts are merely examples, and that other techniques are encompassed by the modes. Moreover, the flowcharts for the segmentation subunits SSUs do not necessarily show all steps involved in the respective preparations for sending packets over the physical transport means L, nor do the flowcharts for the reassembly subunits RSUs necessarily show all steps involved in receipt of packets over the physical transport means L. Only certain example basic steps germane to the present illustration are illustrated in the flowcharts. The person skilled in the art will appreciate the nature and extent of other steps and operations that can be performed. Yet further, the present invention is not confined to having the steps of the segmentation subunits SSUs or the reassembly subunits RSUs performed by either hardware or software (e.g., processor executing coded instructions), as either or a combination of the two are within the scope of the invention.

FIRST EXAMPLE MODE

Figure 3A:
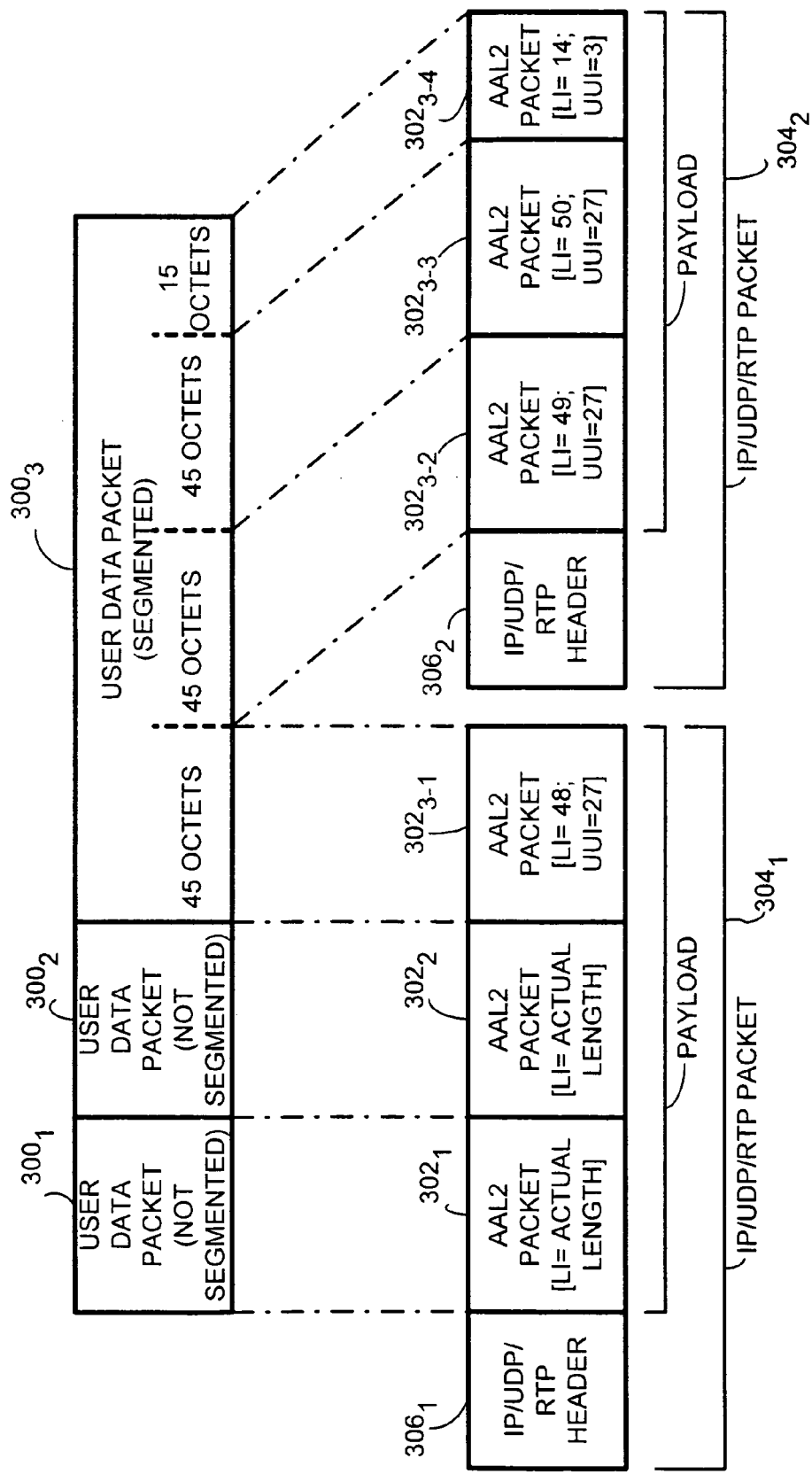
FIG. 3A is a diagrammatic view showing multiplexing of AAL2 packets into an Internet Protocol (IP) packet, in accordance with a first mode of the present invention, with user data packet segmentation.
Figure 3B:
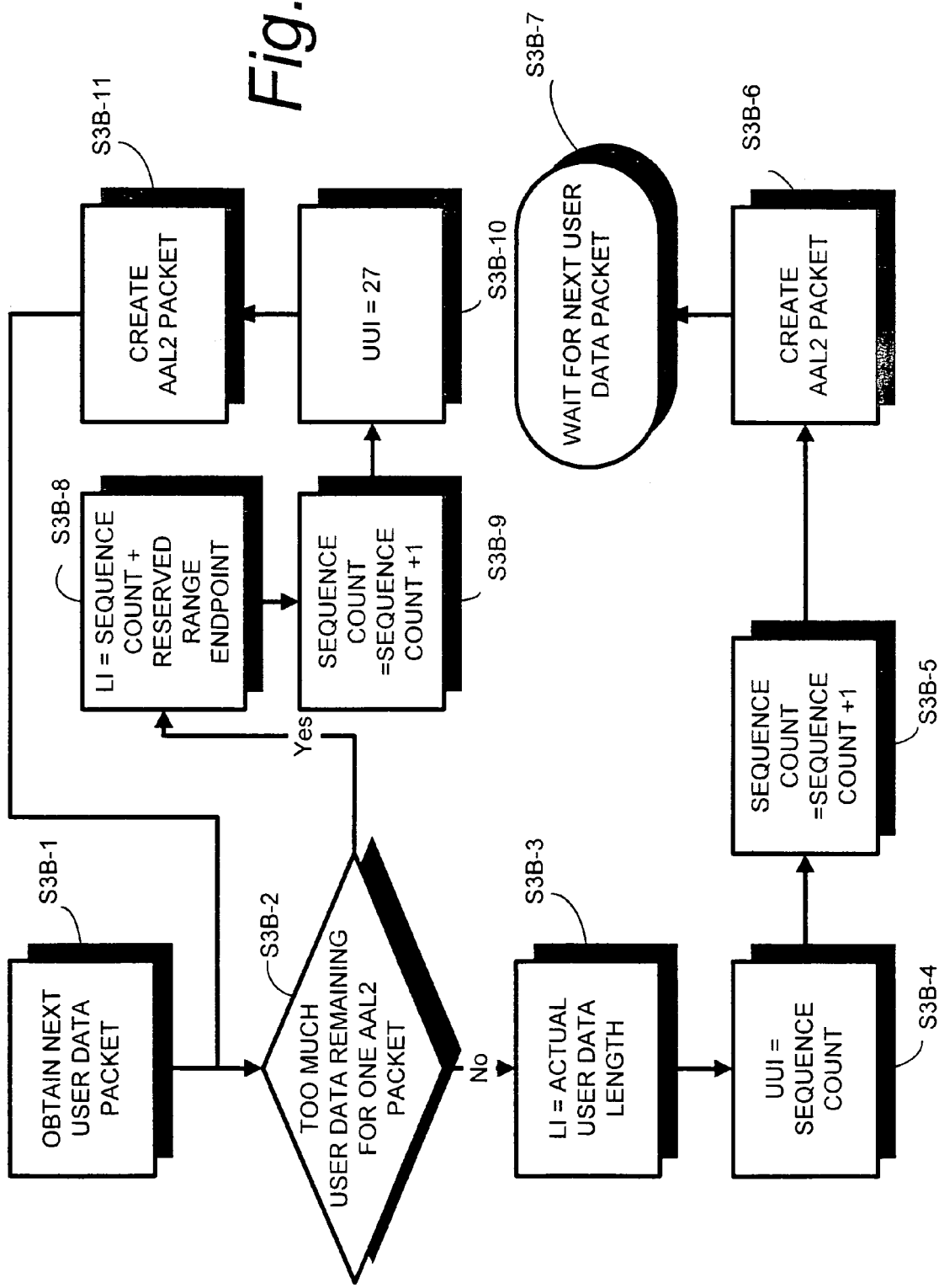
FIG. 3B is a flowchart showing general steps involved in the segmentation of user packets and sequencing of AAL2 packets in accordance with the first mode of the present invention.
Figure 3C:
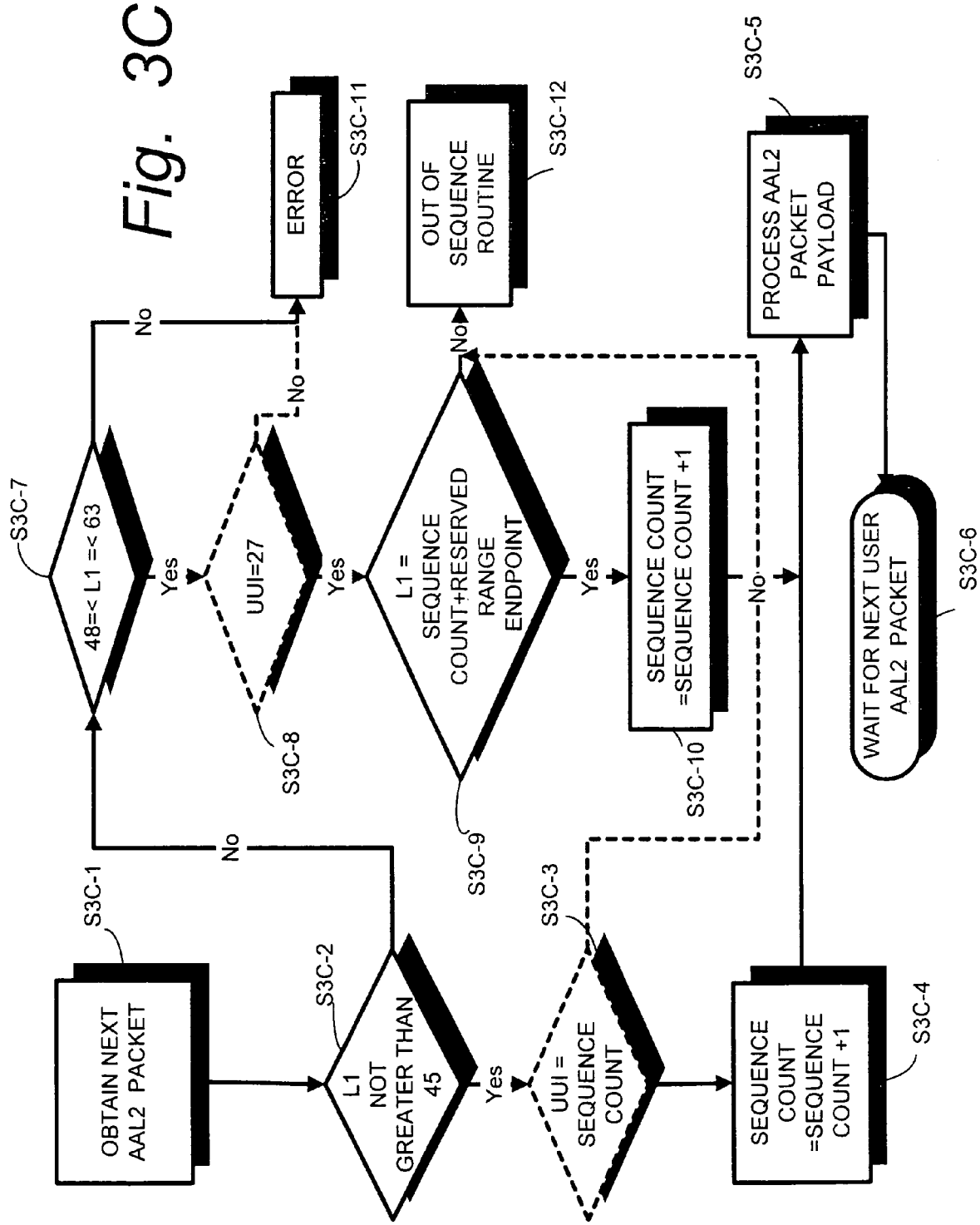
FIG. 3C is a flowchart showing general steps involved in the reassembly of user packets from AAL2 packets in accordance with the first mode of the present invention.

FIG. 3A shows a first mode of the invention involving multiplexing of AAL2 packets into an Internet Protocol (IP) packet, with user data packet segmentation. FIG. 3B shows certain general steps involved in the segmentation of user packets and sequencing of AAL2 packets in accordance with the first mode. FIG. 3C is a flowchart showing certain general steps involved in the reassembly of user packets from AAL2 packets in accordance with the first mode.

In FIG. 3A there are three user data packets $300_1$–$300_3$. Whereas user data packets $300_1$ and $300_2$ are less than 45 octets in length, user data packet $300_3$ is much larger (having 150 octets). As shown in FIG. 3A, the user data packets $300_1$ and $300_2$ can be put into respective AAL2 packets $302_1$ and $302_2$ in much the same manner as described with reference to the user data packets 200 of FIG. 2 being put into AAL2 packets 202, and those AAL2 packets $302_1$ and $302_2$ in turn being put into an Internet Protocol (IP) packet $304_1$. But in the scenario of FIG. 3A the user data packet $300_3$ is so large that it must be segmented or spread into plural AAL2 packets, particularly AAL2 packets $302_{3-1}$ through and including AAL2 packet $302_{3-4}$. In particular, the mapping of the user data packet $300_3$ is such that the first forty five octets of user data packet $300_3$ are loaded into the payload of AAL2 packet $302_{3-1}$, the second forty five octets of user data packet $300_3$ are loaded into the payload of AAL2 packet $302_{3-2}$, the third forty five octets of user data packet $300_3$ are loaded into the payload of AAL2 packet $302_{3-3}$, and the last fifteen octets of user data packet $300_3$ are loaded into the payload of AAL2 packet $302_{3-4}$. As further shown in FIG. 3A, the AAL2 packets $302_1$, $302_2$, and $302_{3-1}$ comprise the payload of Internet Protocol (IP) packet $304_1$, whereas the AAL2 packets $302_{3-2}$, $302_{3-3}$, and $302_{3-4}$ comprise the payload of Internet Protocol (IP) packet $304_2$. Although not illustrated as such in FIG. 3A, it will be understood that in FIG. 3A and similar figures that the Internet Protocol (IP) packets 304 are, in turn, carried by link layer protocol packets, e.g., HDLC/PPP packets such as HDLC/PPP packets 210 shown in FIG. 2 over a physical transport means between nodes.

In the first mode of the invention, when a user data packet payload is spread or segmented over plural AAL2 packets, sequence number-related values for the AAL2 packets (which carry the segmented user data packets) are stored in the length indicator (LI) field of all but the last of the plural AAL2 packets utilized by the segmented user data packet. To facilitate this first mode, a range of values are reserved for the length indicator (LI) field. In the example illustrated in FIG. 3A, the range of reserved or predetermined values extends between 48 and 63, inclusive of both 48 and 63. Thus, the range of predetermined or reserved values comprises numbers which are greater than a maximum number of octets in the payload of a standard size AAL2 packet. In the illustrated example, for all but the last of the plural AAL2 packets over which the user data packet is segmented, the value stored in the length indicator (LI) is the value stored in a wrap-around modulo 16 counter maintained for the channel (CID) associated with the AAL2 packet, plus 48.

In the example shown in FIG. 3A, the AAL2 packets which contain non-segmented user data packets has an length indicator (LI) field value which is directly related to the actual length of the AAL2 payload (binary encoded plus one to the payload length). For AAL2 packets containing non-segmented user data, it is necessary for the length indicator (LI) field to identify the length of the AAL2 packet in conventional manner. But the AAL2 packets $302_{3-1}$ through $302_{3-3}$, which contain the first forty five octets, second forty five octets, and third forty five octets, respectively, of the segmented user data packet $300_3$ have reserved values in their length indicator (LI) fields. In particular, the AAL2 packet $302_{3-1}$ has the first reserved value (e.g., 48); the AAL2 packet $302_{3-2}$ has the second reserved value (e.g., 49); and the AAL2 packet $302_{3-3}$ has the third reserved value (e.g., 50). The last AAL2 packet $302_{3-4}$ into which user data packet $300_3$ is segmented has the actual length value in its length indicator (LI) field, e.g., 14 (the number 14 being the binary encoded plus one value indicating a user data packet length of 15 octets).

In the first mode of the invention, a wrap-around modulo 16 counter is provided for each channel (CID). For segmented not concluded AAL2 packets, the segmentation sub-unit SSU inserts a value related to the sequence count in the length indicator (LI) of an outgoing AAL2 packet (a value equal to the sequence count plus 48). After a segmentation sub-unit SSU prepares an outgoing AAL2 packet, the count maintained by the wrap-around modulo 16 counter is incremented. When a segmented not concluded AAL2 packet is received at a node, the reassembly subunit RSU checks whether the contents of the length indicator (LI) field is in right relation to the sequence count maintained by the wrap-around modulo 16 counter of the reassembly subunit RSU (e.g., whether the contents of the length indicator (LI) is equal to the sequence count plus 48). After the check, the sequence count maintained by the wrap-around modulo 16 counter is incremented by the reassembly subunit RSU. In this first mode of the invention, the sequence count maintained by the wrap-around modulo 16 counter of the segmentation sub-unit SSU is incremented after preparation of every outgoing AAL2 packet regardless of whether the AAL2 packet has segmented not concluded user data or not. Similarly, the sequence count maintained by the wrap-around modulo 16 counter of the reassembly subunit RSU is incremented after checking the sequence of every received AAL2 packet, regardless of whether the AAL2 packet has segmented not concluded user data.

The number to be used in the length indicator (LI) field for AAL2 packets into which the user data packet is segmented is derived from a wrap-around modulo 16 counter which counts through the reserved values, e.g., reserved values 48 to 63 in the FIG. 3A illustrated mode. In the particular scenario shown in FIG. 3A, it is assumed that the wrap-around modulo 16 counter has just started with 0.

In addition, in this first mode of the invention, the User-to-User indicator (UUI) field of all but the last of the AAL2 packets accommodating segmented user data packets contains a preselected value, the preselected value serving as a notification that the AAL2 packet is not the last AAL2 packet serving the user data packet and that other AAL2 packets for the same user data packet are to be expected. In the FIG. 3A illustrated implementation of this first mode, this continuation notification preselected value for the User-to-User indicator (UUI) field is 27.

Therefore, in this first mode, when an AAL2 packet is detected before reassembly as having a value in the reserved range (e.g., from 48 to 63 inclusive), that AAL2 packet is recognized as serving a segmented user data packet, and having a sequence number which is derived from the value in the length indicator (LI) field. A modulo division of the contents of the length indicator (LI) field provides the sequence number for the AAL2 packet. This sequence number therefore assists in detection of receipt of out-of-order packets.

A last AAL2 packet of the plural AAL2 packets accommodating the segmented user data packet is detectable in the first mode, since it has in its length indicator field a value not greater than the maximum number of octets in a standard size AAL2 packet. Moreover, the contents of the User-to-User indicator (UUI) field of such a last AAL2 packet can be used to confirm that the last AAL2 packet is in a proper sequence. In this regard, the User-to-User indicator (UUI) field in the header of the last AAL2 packet has a value Q-E, where Q is the reserved number that would have been used in the length indicator field had the last cell not been the last cell, and wherein E is an endpoint of the range. In other words, the value in the User-to-User indicator (UUI) field for the last AAL2 packet of plural AAL2 packets having segmented user data is the sequence number maintained by the wrap-around modulo 16 counter. For example, AAL2 packet $302_{3-4}$ of FIG. 3A has the value "3" in the User-to-User indicator (UUI) field. The expression Q-E therefore equals 3 for AAL2 packet $302_{3-4}$, and since the endpoint of the range E is 48, it can be determined at the value Q for AAL2 packet $302_{3-4}$ is 51. The Q value of 51 for AAL2 packet $302_{3-4}$, coming after the LI value of 50 for AAL2 packet $302_{3-3}$, confirms that AAL2 packet $302_{3-4}$ is received in the correct sequence.

FIG. 3B shows certain general steps performed by segmentation subunit SSU for the first mode of the invention. As indicated above, the segmentation subunit SSU has a wrap-around modulo 16 counter whose value is incremented for maintaining a sequence number. Step S3B-1 shows the segmentation subunit SSU obtaining a next user data packet in anticipation of preparing of mapping the obtained user data into one or more AAL2 packets. At step S3B-2, a determination is made by segmentation subunit SSU where there is too much data in the user data packet to fit into one AAL2 packet.

If it is determined at step S3B-2 that the amount of user data to be processed is not too much for one AAL2 packet, at step S3B-3 an length indicator (LI) field for the AAL2 packet is prepared to have as its contents the actual user data length (e.g., the binary encoded plus one to the payload length). Therefore, the sequence count maintained by the wrap-around modulo 16 counter is not used to prepare the length indicator (LI) field for such an AAL2 packet. However, the sequence count maintained by the wrap-around modulo 16 counter is stored in the User-to-User indicator (UUI) field in accordance with the Q-E expression above discussed at step S3B-4. Then, at step S3B-5, the segmentation subunit SSU increments by one the value of the sequence count as maintained by the wrap-around modulo 16 counter of the segmentation subunit SSU. The segmentation subunit SSU can then facilitate creation of the AAL2 packet as indicated by step S3B-6, and then await a next user data packet for processing (as reflected by step S3B-7).

It will be appreciated with reference to FIG. 3A that the set of steps comprising step S3B-3 through step S3B-7 are performed for the AAL2 packet $302_1$ and AAL2 packet $302_2$. In this regard, the AAL2 packet $402_1$ and AAL2 packet $302_2$ each have actual payload length-related values in the length indicator (LI) field. In addition, the set of steps comprising step S3B-3 through step S3B-7 are performed for the AAL2 packet $302_{3-4}$ (after the routine of FIG. 3B has been performed to create AAL2 packet $302_{3-1}$, AAL2 packet $302_{3-2}$, and AAL2 packet $302_{3-3}$).

If it is determined at step S3B-2 that the amount of user data to be processed is too much for one AAL2 packet, at step S3B-8 an length indicator (LI) field for the AAL2 packet is prepared to have as its contents a value related to the current sequence count as maintained by the wrap-around modulo 16 counter of the segmentation subunit SSU. In particular, at step S3B-8 the length indicator (LI) acquires the value of the sequence count plus 48. Thereafter the sequence count (e.g., the wrap-around modulo 16 counter) is incremented at step S3B-9. At step S3B-10 a value is 27 is prepared for the User-to-User indicator (UUI) field for the AAL2 packet, since the AAL2 packet is a continuing but not last packet into which a user data packet is segmented. The segmentation subunit SSU can then facilitate creation of the AAL2 packet as indicated by step S3B-11.

The foregoing procedure described with reference to step S3B-8 through step S3B-11 occurs to create each of the AAL2 packet $302_{3-1}$, AAL2 packet $302_{3-2}$, and AAL2 packet $302_{3-3}$ of FIG. 3A. After the creation of each such AAL2 packet, the segmentation subunit SSU checks back at step S3B-2 to determine if the user data packet obtained at step S3B-1 has too much user data remaining to stuff into a single AAL2 packet. The determination of step S3B-2 is affirmative after the creation of each of AAL2 packet $302_{3-1}$ and AAL2 packet $302_{3-2}$, but is negative after creation of AAL2 packet $302_{3-3}$. After AAL2 packet 3023-3 has been created, only 15 octets of user data remain, which can be contained in a single AAL2 packet. Therefore, after creation of AAL2 packet $302_{3-3}$, the set of steps comprising step S3B-3 through step S3B-7 are performed (as above explained) for creating AAL2 packet $302_{3-4}$.

The wrap-around modulo 16 counter can have values only of 0 to 15 inclusive. While FIG. 3B does not reflect the fact that the incrementation of the wrap-around modulo 16 counter (e.g., at step S3B-5 and step S3B-9) is governed by the limited range of values, it will be appreciated that an incrementation of the wrap-around modulo 16 counter after having a sequence count of 15 leaves the wrap-around modulo 16 counter with an incremented sequence count of 0.

Whereas FIG. 3B depicts basic steps performed by a segmentation subunit SSU in connection with preparation of an AAL2 packet for the first mode of the invention, FIG. 3C illustrates basic steps performed by a reassembly subunit RSU. The reassembly subunit RSU serves to reassemble user data packets from the AAL2 packets received from another node (as carried by Internet Protocol (IP) packets within link layer packets) over the physical transport means. FIG. 3C shows as step S3C-1 receipt of a next AAL2 packet.

As used herein, a received AAL2 packet which carries "segmented not concluded user data" is one of plural AAL2 packets which carries user data of the same user data packet, but is not the last such one of the AAL2 packets (i.e., does not conclude or complete the user data from the user data packet). In order to determine whether the received AAL2 packet is an AAL2 packet which carries segmented not concluded user data, a check is made at step S3C-2 whether the contents of the length indicator (LI) field of the received AAL2 packet is not greater than forty five. If the contents of the length indicator (LI) field of the received AAL2 packet is not greater than forty five (as occurs for AAL2 packet $302_1$, AAL2 packet $302_2$, and AAL2 packet 3023-4, for example), the reassembly subunit RSU realizes that the AAL2 packet does not carry segmented not concluded user data.

In the case of a received AAL2 packet not carrying segmented not concluded user data, at step S3C-3 an optional check is made to ascertain whether the received AAL2 packet is in the proper sequence. Specifically, at step S3C-3 the reassembly subunit RSU ascertains whether the contents of the User-to-User indicator (UUI) field of the received AAL2 packet equals the sequence count maintained by the wrap-around modulo 16 counter of the reassembly subunit RSU. For example, if receipt of AAL2 packet $302_{3-4}$ occurs in proper order, the sequence count as maintained by the wrap-around modulo 16 counter of the segmentation/reassembly unit SRU will be 3 upon receipt of AAL2 packet $302_{3-4}$. If perchance it is determined at step S3C-3 that the received AAL2 packet is out of order (indicating, e.g., a lost AAL2 packet), then an out of sequence routine can be performed (step S3C-12). The out of sequence routine can attempt to compensate for the absence of loss of an AAL2 packet, or perform other conventional remedial measures.

At step S3C-4 the reassembly subunit RSU increments the sequence count maintained by its wrap-around modulo 16 counter by one. At step S3C-5 the payload of the received AAL2 packet is processed, after which the reassembly subunit RSU essentially awaits another AAL2 packet (as depicted by step S3C-6).

In the case of a received AAL2 packet carrying segmented not concluded user data, at step S3C-7 a check is made to confirm that the contents of the length indicator (LI) field for the received AAL2 packet is within the reserved range. In the illustrated example the reserved range is 48 to 63 inclusive. If the contents of the length indicator (LI) field is not within the reserved range, an error is declared at step S3C-11.

The fact that a received AAL2 packet carries segmented not concluded user data is corroborated at step S3C-8. Specifically, at step S3C-8 the reassembly subunit RSU checks if contents of the User-to-User indicator (UUI) field of the received AAL2 packet is 27. It will be recalled that the value 27 for the User-to-User indicator (UUI) field was selected as an indicator that the AAL2 packet contains segmented user data which is continued in a subsequent AAL2 packet. If the determination at step S3C-8 is negative, an error is declared at step S3C-11.

At step S3C-9 the reassembly subunit RSU checks packet reception order by ascertaining whether the contents of the length indicator (LI) field in the received AAL2 packet is properly related to the current value of the sequence count as maintained by the wrap-around modulo 16 counter of the reassembly subunit RSU. If the contents of the length indicator (LI) field is other than that of the sequence count plus the reserved range lower endpoint (e.g., plus 48), the reassembly subunit RSU supposes that an AAL2 packet has been lost, and accordingly executes the out of sequence route depicted by step S3C-12.

The sequence count maintained by the wrap-around modulo 16 counter of the reassembly subunit RSU is incremented at step S3C-10, which follows an affirmative determination at step S3C-9. After the wrap-around modulo 16 counter has been incremented, at step S3C-5 the payload of the received AAL2 packet is processed, after which the reassembly subunit RSU essentially awaits another AAL2 packet (as depicted by step S3C-6).

Figure 3D:
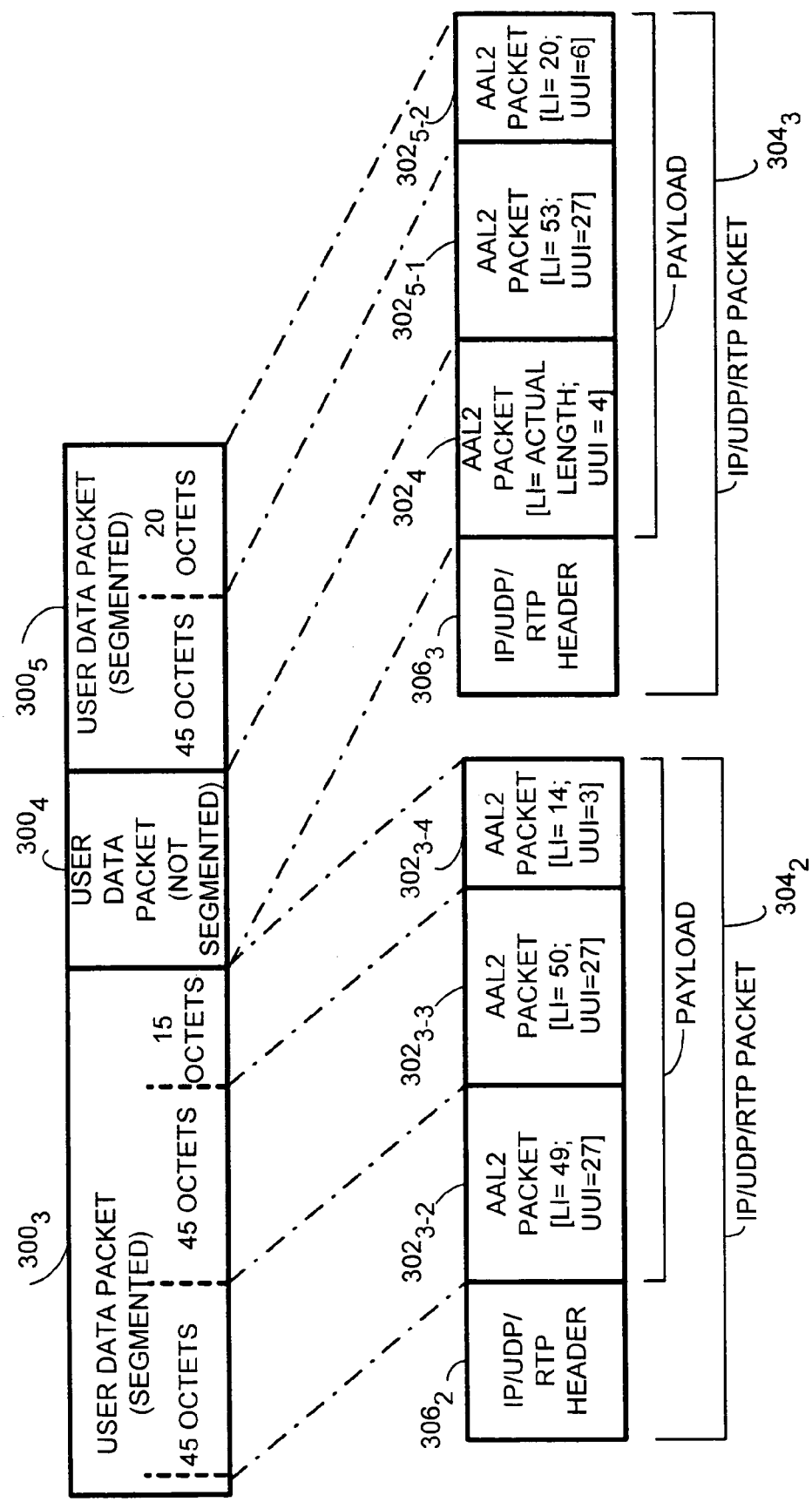
FIG. 3D is a diagrammatic view showing an extrapolation of the scenario of FIG. 3A.

Extrapolating the illustration of FIG. 3A and the first mode of the invention as shown in FIG. 3D, suppose that the next user data packet $300_4$ belongs to the same CID as does user data packet $300_3$, and that the next user data packet $300_4$ can fit into a single AAL2 packet (e.g. that the user data of the next user data packet $300_4$ does not need to be segmented). In accordance with the first mode, the length indicator (LI) for the AAL2 packet for user data packet $300_3$ would have a contents related to its length, and a User-to-User indicator (UUI) field value of 4 (4 being the sequence count upon preparation of the corresponding AAL2 packet $302_4$).

Continuing with the foregoing, suppose further that the next user data packet $300_5$ cannot be placed in a single AAL2 packet, and accordingly is segmented over plural AAL2 packets. In the first AAL2 packet $302_{5-1}$ for user data packet $300_5$, the length indicator (LI) field contents would be 53 (and the User-to-User indicator (UUI) field would be 27). Thus, in the first mode of the invention, the length indicator (LI) field and the User-to-User indicator (UUI) field complement each other, since the User-to-User indicator (UUI) field cannot be used as a sequence count for segmented packets (except the last one) according to ITU specification I.366.1.

SECOND EXAMPLE MODE

Figure 4A:
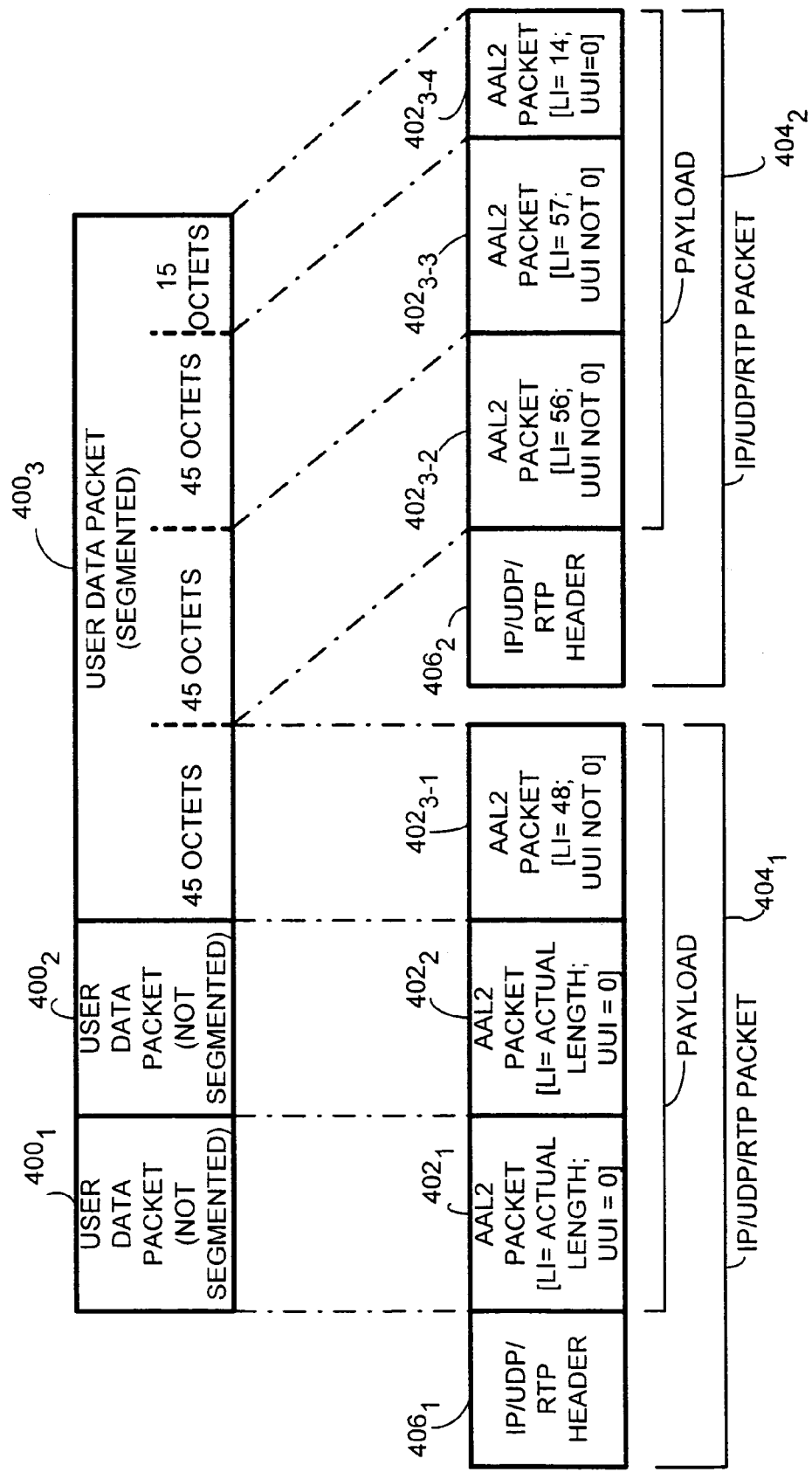
FIG. 4A is a diagrammatic view showing multiplexing of AAL2 packets into an Internet Protocol (IP) packet, in accordance with a second mode of the present invention, with user data packet segmentation.
Figure 4B:
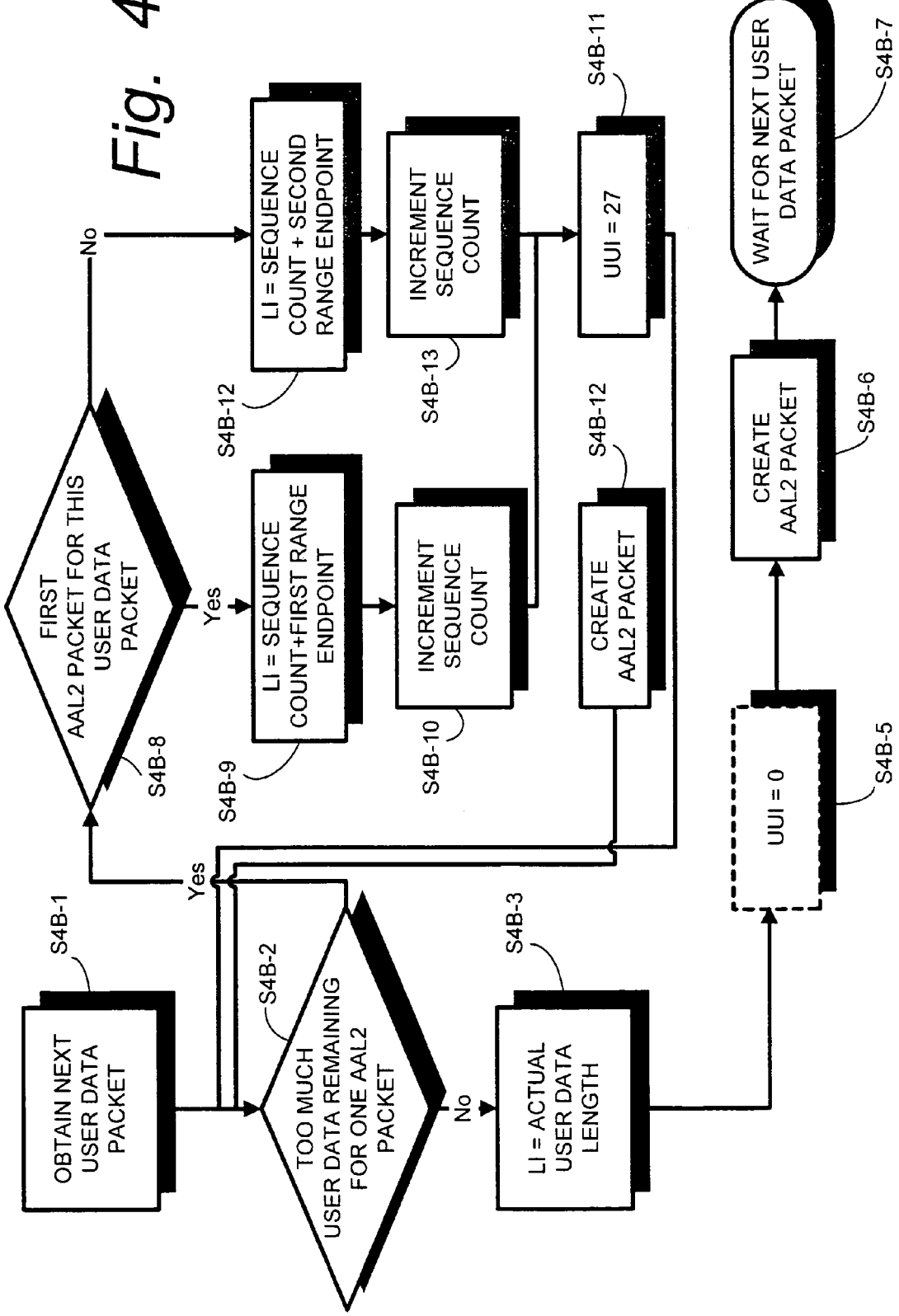
FIG. 4B is a flowchart showing general steps involved in the segmentation of user packets and sequencing of AAL2 packets in accordance with the second mode of the present invention.
Figure 4C:
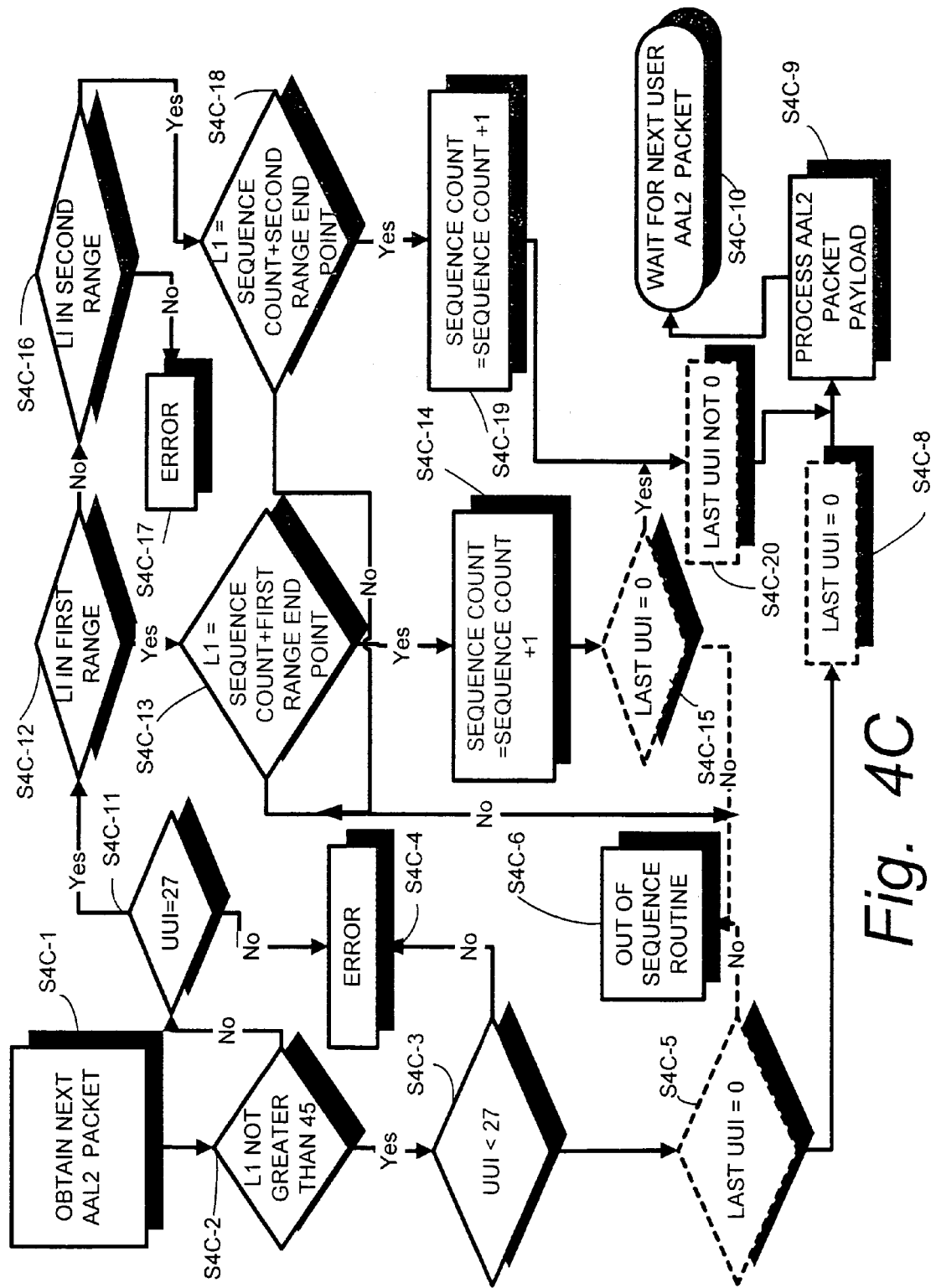
FIG. 4C is a flowchart showing general steps involved in the reassembly of user packets from AAL2 packets in accordance with the second mode of the present invention.

FIG. 4A shows a second mode of the invention involving multiplexing of AAL2 packets into an Internet Protocol (IP) packet, with user data packet segmentation. FIG. 4B shows certain general steps involved in the segmentation of user packets and sequencing of AAL2 packets in accordance with the second mode. FIG. 4C is a flowchart showing certain general steps involved in the reassembly of user packets from AAL2 packets in accordance with the second mode.

FIG. 4A has the same three user data packets as FIG. 3A, but renumbered as $400_1$–$400_3$. In FIG. 4A, the user data packets $400_1$ and $400_2$ are put into respective AAL2 packets $402_1$ and $402_2$, and the user data packet $400_3$ (being sufficiently large) is segmented or spread into AAL2 packets $402_{3-1}$ through and including AAL2 packet $402_{3-4}$.

The second mode of the invention resembles the first mode in that, when a user data packet payload is spread or segmented over plural AAL2 packets, the sequence number-related values for the AAL2 packets (which carry the segmented user data packets) are stored in the length indicator (LI) field of the plural AAL2 packets utilized by the segmented user data packet. In contrast to the first mode, in the second mode two ranges of values are reserved for the length indicator (LI) field.

In the implementation of the second mode illustrated in FIG. 4A, the first range of reserved or predetermined values extends between 48 and 55, inclusive of both 48 and 55, while the second range of reserved or predetermined values extends between 56 and 63, inclusive of both 56 and 63. When the length indicator (LI) field of a received AAL2 packet belongs to the first range, the received AAL2 packet is recognized as being for a first of the plural AAL2 packets containing the user data of the user data frame. When the length indicator (LI) field of a received AAL2 packet belongs to the second range, the received AAL2 packet is recognized as being other than the first of the plural AAL2 packets (e.g., a second, third, fourth AAL2 packet, etc.).

Thus, the second mode of the invention essentially divides the reserved range of the first mode into two reserved ranges, e.g., a first range of from 48 to 55 inclusive and a second range of from 56 to 63 inclusive. Whereas the first mode has a wrap-around modulo 16 counter, in the second mode a wrap-around modulo 8 counter is provided for each channel (CID). For a segmented not concluded AAL2 packet which is a first of plural AAL2 packet over which user data is segmented, the segmentation sub-unit SSU inserts a value having a first relation to the sequence count in the length indicator (LI) of an outgoing AAL2 packet. In the illustrated embodiment, such value for the length indicator (LI) field for a first such AAL2 packet is the sequence count plus 48. For non-first and non-last AAL2 packets over which the user data is segmented, the segmentation sub-unit SSU inserts a value having a second relation to the sequence count in the length indicator (LI) of an outgoing AAL2 packet. In the illustrated embodiment, such value for the length indicator (LI) field for a non-first and non-last such AAL2 packet is the sequence count plus 55. After a segmentation sub-unit SSU prepares an outgoing AAL2 packet containing segmented user data, the count maintained by the wrap-around modulo 16 counter is incremented.

When a segmented not concluded AAL2 packet is received at a node, the reassembly subunit RSU checks whether the contents of the length indicator (LI) field has the first relation to the sequence count maintained by the wrap-around modulo 8 counter of the reassembly subunit RSU (e.g., whether the contents of the length indicator (LI) is equal to the sequence count plus 48). After the check, the sequence count maintained by the wrap-around modulo 8 counter is incremented by the reassembly subunit RSU. For a non-first or non-last AAL2 packet having segmented user data, the reassembly subunit RSU checks whether the contents of the length indicator (LI) field has the second relation to the sequence count maintained by the wrap-around modulo 8 counter of the reassembly subunit RSU (e.g., whether the contents of the length indicator (LI) is equal to the sequence count plus 55). In this second mode of the invention, the sequence count maintained by the wrap-around modulo 8 counter of the segmentation sub-unit SSU is incremented only after preparation of an outgoing AAL2 having segmented not concluded user data. Similarly, the sequence count maintained by the wrap-around modulo 8 counter of the reassembly subunit RSU is incremented only after checking the sequence of a received AAL2 packet which has segmented not concluded user data.

In the example scenario of FIG. 4A, the first AAL2 packet having segmented not concluded user data is AAL2 packet $402_{3-1}$. In accordance with the second mode, the contents of the length indicator (LI) field of AAL2 packet $402_{3-1}$ is in the first range. It so happens in the scenario of FIG. 4A that the length indicator (LI) field of AAL2 packet $402_{3-1}$ is the first possible value in the first range, i.e., 48. This is because upon creation of AAL2 packet $402_{3-1}$ the sequence count of the wrap-around modulo 8 counter of the segmentation/reassembly unit SRU was 0. The second and third AAL2 packets having segmented not concluded user data are AAL2 packet $402_{3-2}$ and AAL2 packet $402_{3-3}$. Both AAL2 packet $402_{3-2}$ and AAL2 packet $402_{3-3}$ have the contents of their length indicator (LI) fields from the second range. Specifically, AAL2 packet $402_{3-2}$ has the value 56 in its length indicator (LI) field; AAL2 packet $402_{3-3}$ has the subsequent value 57 in its length indicator (LI) field.

In the second mode of the invention, the User-to-User indicator (UUI) value of 27 can also (as in the first mode) be optionally used to flag an AAL2 packet as having segmented not concluded user data. AAL2 packets having non-segmented user data can have their User-to-User indicator (UUI) field contents in the normal range (e.g., 1 to 26 inclusive). In the second mode, a last AAL2 packet of the plural AAL2 packets allows for an optional predetermined end-of-user data packet value (e.g., zero) in its user-to-user indication (UUI) field of its header. This optional predetermined end-of-user data packet value serves to mark reception of the end of the user data packet. In the scenario of FIG. 4A, for example, although AAL2 packet $402_{3-4}$ has segmented user data, the AAL2 packet $402_{3-4}$ does not have segmented not concluded user data because it is the last AAL2 packet containing the user data of user data packet $400_3$, and thus does conclude the user data for user data packet $400_3$. In the illustrated scenario, the predetermined end-of-user data packet value for the User-to-User indicator (UUI) field is zero. Accordingly, the User-to-User indicator (UUI) field for AAL2 packet 40234 in FIG. 4A has a zero stored therein.

The second mode thus has provision for determining loss of the last AAL2 packet containing the last segment (e.g., end) of a user data packet. If, in the second mode, a last AAL2 packet containing the last segment (e.g., end) of a user data packet is lost, such loss will be ascertained upon next encountering a new AAL2 packet having a first range value in its length indicator (LI) field or a value in the User-to-User indicator (UUI) field in the normal range (1 to 26 inclusive). That is, while looking for such an AAL2 packet containing the last segment of a user data packet, before encountering an AAL2 packet with the predetermined end-of-user data packet value the reassembly subunit RSU will encounter either: (1) a new AAL2 packet having a first range value in its length indicator (LI) field; or (2) an AAL2 packet having its contents in the normal range.

FIG. 4B shows certain general steps performed by segmentation subunit SSU for the second mode of the invention. As indicated above, for each CID having segmented user data the segmentation subunit SSU has a first wrap-around modulo 8 counter which maintains the sequence count for the respective CID.

Step S4B-1 shows the segmentation subunit SSU obtaining a next user data packet in anticipation of preparing of mapping the obtained user data into one or more AAL2 packets. At step S4B-2, a determination is made by segmentation subunit SSU where there is too much data in the user data packet to fit into one AAL2 packet.

If it is determined at step S4B-2 that the amount of user data to be processed is not too much for one AAL2 packet, at step S4B-3 an length indicator (LI) field for the AAL2 packet is prepared to have as its contents the actual user data length (e.g., the binary encoded plus one to the payload length). Therefore, the sequence count maintained by the first wrap-around modulo 8 counter is not used to prepare the length indicator (LI) field for such an AAL2 packet. Then, since the AAL2 packet to be created wholly accommodates the user data packet or is the last of plural AAL2 packets accommodating segmented user data from the user data packet, as an optional step the predetermined end-of-user data packet value (e.g., zero) is stored in the User-to-User indicator (UUI) field at step S4C-5. The segmentation subunit SSU can then facilitate creation of the AAL2 packet as indicated by step S4B-6, and then await a next user data packet for processing (as reflected by step S4B-7).

It will be appreciated with reference to FIG. 4A that the set of steps comprising step S4B-3 through step S4B-7 are performed for the AAL2 packet $402_1$ and AAL2 packet $402_2$. In this regard, the AAL2 packet $402_1$, and AAL2 packet $402_2$ each have actual payload length-related values in the length indicator (LI) field. In addition, the set of steps comprising step S4B-3 through step S4B-7 are performed for the AAL2 packet $402_{3-4}$ (after the routine of FIG. 4B has been performed to create AAL2 packet $402_{3-1}$, AAL2 packet $402_{3-2}$, and AAL2 packet $402_{3-3}$).

If it is determined at step S4B-2 that the amount of user data to be processed is too much for one AAL2 packet, at step S4B-8 the segmentation subunit SSU determines whether the AAL2 packet about-to-be-created will be the first of plural AAL2 packets containing segmented user data for a user data packet. If the AAL2 packet about-to-be-created will be the first of plural AAL2 packets, step S4B-9, step S4B-10, step S4B-11, and step SB412 are performed before returning to step S4B-3. On the other hand, if the AAL2 packet about-to-be-created will not be the first of plural AAL2 packets (e.g., is a second, third, fourth, etc. AAL2 packet), step SB4-13, step SB4-14, step S4B-11, and step SB412 are performed before returning to step S4B-3.

Assuming that the AAL2 packet about-to-be-created will be the first of plural AAL2 packets, at step S4B-9 a length indicator (LI) field for the AAL2 packet is prepared to have as its contents the sum of 48 and the current first sequence count as maintained by the wrap-around modulo 8 counter of the segmentation subunit SSU. Thereafter the sequence count (e.g., the wrap-around modulo 8 counter) is incremented at step S4B-10. As an optional step, at step S4B-11 a value of 27 is inserted into the User-to-User indicator (UUI) field to indicate that the AAL2 packet contains segmented not concluded user data. Then, the segmentation subunit SSU can then facilitate creation of the first AAL2 packet as indicated by step SB4-12.

The foregoing procedure described with reference to step S4B-9 through step SB4-12 occurs to create the AAL2 packet $402_{3-1}$. After the creation of AAL2 packet $402_{3-1}$, the segmentation subunit SSU checks back at step S4B-2 to determine if the user data packet obtained at step S4B-1 has too much user data remaining to stuff into a single AAL2 packet. The determination of step S3B-2 is affirmative after the creation of AAL2 packet $302_{3-1}$. Therefore, after creation of AAL2 packet $302_{3-1}$, step S4B-2 and step S4B-8 are executed, with an affirmative decision obtain at each of these steps.

Assuming that the AAL2 packet about-to-be-created is other than the first of plural AAL2 packets for user data from a single user data packet, at step SB4-13 a length indicator (LI) field for the AAL2 packet is prepared to have as its contents the current sequence count as maintained by the wrap-around modulo 8 counter of the segmentation subunit SSU. Thereafter the sequence count (e.g., the second wrap-around modulo 8 counter) is incremented at step SB4-14. The steps S4B-11 and S4B-12 are then performed as above described in order to prepare the User-to-User indicator (UUI) field of the AAL2 packet, and then the AAL2 packet packet itself.

The foregoing procedure described with reference to step SB4-13 through step SB4-12 occurs to create each of the AAL2 packet $402_{3-2}$ and AAL2 packet $402_{3-3}$. After the creation of each of AAL2 packet $402_{3-2}$ and AAL2 packet $402_{3-3}$, the segmentation subunit SSU checks back at step S4B-2 to determine if the user data packet obtained at step S4B-1 has too much user data still remaining to stuff into a single AAL2 packet. The determination of step S3B-2 is affirmative after the creation of AAL2 packet $302_{3-2}$, necessitating a repeat of step SB4-13, step SB4-14, step SB4-11, and step SB4-12 to create AAL2 packet $402_{3-3}$. But after creation of AAL2 packet $402_{3-3}$, the decision at step S4B-2 is negative, since only fifteen octets remain to be processed in the user data packet $400_3$. Therefore, after creation of AAL2 packet $402_{3-3}$, the set of steps comprising step S4B-3 through step S4B-7 are performed (as above explained) for creating AAL2 packet $402_{3-4}$.

Whereas FIG. 4B depicts basic steps performed by a segmentation subunit SSU in connection with preparation of an AAL2 packet for the second mode of the invention, FIG. 4C illustrates basic steps performed by a reassembly subunit RSU for the second mode. The reassembly subunit RSU serves to reassemble user data packets from the AAL2 packets received from another node (as carried by Internet Protocol (IP) packets within link layer packets) over the physical transport means. FIG. 4C shows as step S4C-1 receipt of a next AAL2 packet.

In order to determine whether the received AAL2 packet is an AAL2 packet which carries segmented not concluded user data, a check is made at step S4C-2 whether the contents of the length indicator (LI) field of the received AAL2 packet is not greater than forty five. If the contents of the length indicator (LI) field of the received AAL2 packet is not greater than forty five (as occurs for AAL2 packet $402_1$, AAL2 packet $402_2$, and AAL2 packet $402_{3-4}$, for example), the reassembly subunit RSU realizes that the AAL2 packet does not carry segmented not concluded user data.

In the case of a received AAL2 packet not carrying segmented not concluded user data, at step S4C-3 a confirmation check is made to ascertain whether the received AAL2 packet has contents which are either the predetermined end-of-user data value or within the normal range of the User-to-User indicator (UUI) field values. Specifically, step S4C-3 of FIG. 4C shows the reassembly subunit RSU checking to see if the contents of the User-to-User indicator (UUI) field of the received AAL2 packet is less than 27. If the confirmation check of step S4C-3 fails, an error is declared at step S4C-4.

At step S4C-5 the reassembly subunit RSU optionally checks for missing or lost AAL2 packets by ascertaining whether the flag LAST UUI is non-zero. If at step S4C-5 the reassembly subunit RSU determines that the flag LAST UUI is non-zero, then the reassembly subunit RSU realizes that an expected last one of plural AAL2 packets for a segmented user data-packet was not received. Upon such realization, the out of sequence routine of step S4C-6 is performed. Such out of sequence routine has been previously described. Then as another optional step, at step S4C-8, the flag LAST UUI is set equal to zero. As explained previously with reference to step S4C-5 and subsequently illustrated with respect to step S4C-15, the setting of the flag LAST UUI to zero facilitates detection of lost AAL2 packets, particularly a lost last one of plural AAL2 packets having for segmented user data from the same user data packet. At step S4C-9 the payload of the received AAL2 packet is processed, after which the reassembly subunit RSU essentially awaits another AAL2 packet (as depicted by step S4C-10).

In the case of a received AAL2 packet carrying segmented not concluded user data, a check is first performed at step S4C-11 to confirm that the contents of the User-to-User indicator (UUI) field of the received AAL2 packet is 27. Then a check is performed at step S4C-12 to determine whether the contents of the length indicator (LI) field for the received AAL2 packet is within the first reserved range. In the illustrated example the first reserved range is 48 to 55 inclusive. If the contents of the length indicator (LI) field is not within the first reserved range, a check is next performed at step S4C-16 to determine whether the contents of the length indicator (LI) field for the received AAL2 packet is within the second reserved range. In the illustrated example the second reserved range is 56 to 63 inclusive. If the contents of the length indicator (LI) field is not within the second reserved range, an error is declared at step S4C-17.

Assuming that the contents of the length indicator (LI) field for the received AAL2 packet is within the first reserved range, at step S4C-13 the reassembly subunit RSU checks packet reception order by ascertaining whether the contents of the length indicator (LI) field in the received AAL2 packet equals the quantity formed by the sum of the low endpoint of the first range (e.g., 48) and the current value of the sequence count as maintained by the wrap-around modulo 8 counter of the reassembly subunit RSU. If the contents of the length indicator (LI) field is other than such quantity, the reassembly subunit RSU supposes that an AAL2 packet has been lost, and accordingly executes the out of sequence route depicted by step S4C-6. The sequence count maintained by the wrap-around modulo 8 counter of the reassembly subunit RSU is incremented at step S4C-14, which follows an affirmative determination at step S4C-13.

At step S4C-15, the reassembly subunit RSU, realizing that it has just received a first one of plural AAL2 packets over which user data from a single user data packet has been segmented, optionally checks to ensure that the AAL2 packet which preceded the just received AAL2 packet has a value in its User-to-User indicator (UUI) field which would tend to confirm that no AAL2 packets have been lost. In particular, at step S4C-15 the reassembly subunit RSU checks to ensure that the flat LAST UUI is zero, thereby confirming that no AAL2 packets have been lost. If the determination at step S4C-15 is negative, the out of sequence routine is performed (see step S4C-6).

If the determination at optional step S4C-15 is affirmative, at optional step S4C-20 the reassembly subunit RSU sets the flag LAST UUI to non-zero (e.g., not equal [.NE.] to zero). If desired, before setting the flag LAST UUI to non-zero at step S4C-20 a check can be made to ensure that the User-to-User indicator (UUI) field for the just received AAL2 packet is, in fact, non-zero. Then, at step S4C-9 the payload of the received AAL2 packet is processed, after which the reassembly subunit RSU essentially awaits another AAL2 packet (as depicted by step S4C-10).

Assuming that the contents of the length indicator (LI) field for the received AAL2 packet is within the second reserved range, at step S4C-18 the reassembly subunit RSU checks packet reception order by ascertaining whether the contents of the length indicator (LI) field in the received AAL2 packet equals the quantity formed by the sum of the low endpoint of the second range (e.g., 55) and the current value of the sequence count as maintained by the wrap-around modulo 8 counter of the reassembly subunit RSU. If the contents of the length indicator (LI) field is other than that of such quantity, the reassembly subunit RSU supposes that an AAL2 packet has been lost, and accordingly executes the out of sequence route depicted by step S4C-6. The sequence count maintained by the wrap-around modulo 8 counter of the reassembly subunit RSU is incremented at step S4C-19, which follows an affirmative determination at step S4C-18.

At step S4C-20 the reassembly subunit RSU optionally sets the flag LAST UUI to non-zero (e.g., not equal [.NE.] to zero). As mentioned previously, if desired a check can be made to ensure that the User-to-User indicator (UUI) field for the just received AAL2 packet is, in fact, non-zero. Then, at step S4C-9 the payload of the received AAL2 packet is processed, after which the reassembly subunit RSU essentially awaits another AAL2 packet (as depicted by step S4C-10).

THIRD EXAMPLE MODE

Figure 5A:
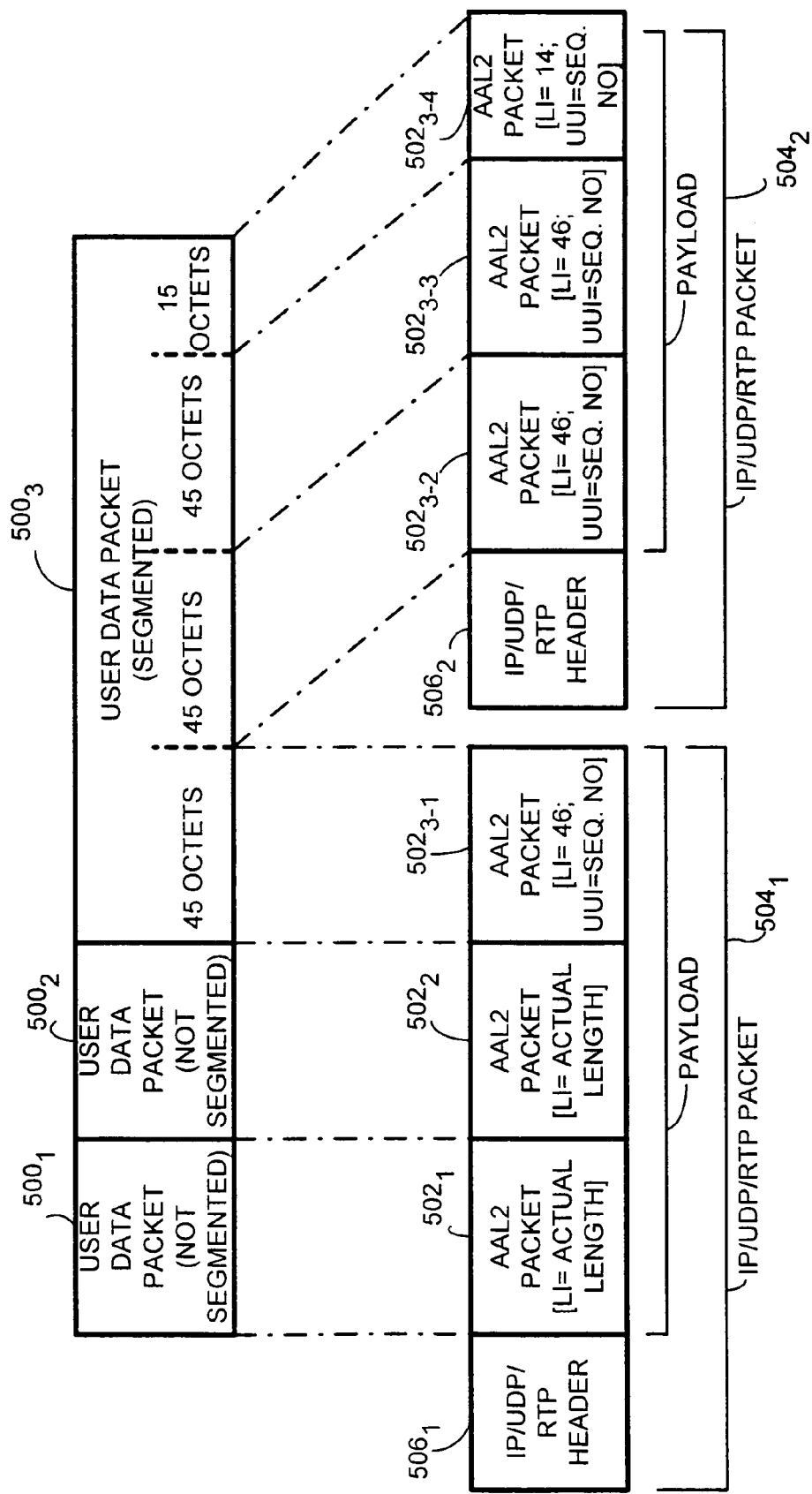
FIG. 5A is a diagrammatic view showing multiplexing of AAL2 packets into an Internet Protocol (IP) packet, in accordance with a third mode of the present invention, with user data packet segmentation.
Figure 5B:
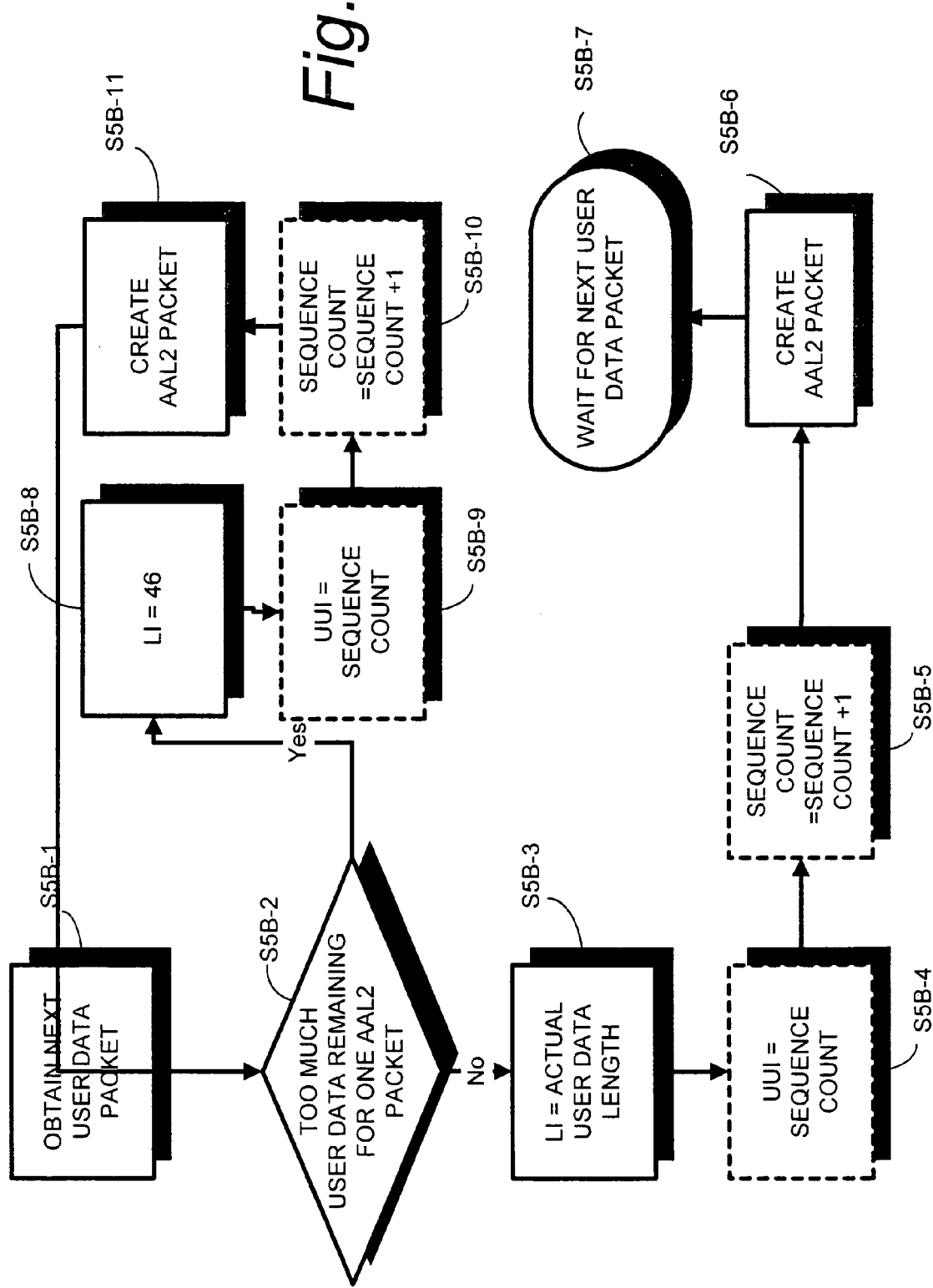
FIG. 5B is a flowchart showing general steps involved in the segmentation of user packets and sequencing of AAL2 packets in accordance with the third mode of the present invention.

FIG. 5A shows a third mode of the invention involving multiplexing of AAL2 packets into an Internet Protocol (IP) packet, with user data packet segmentation. FIG. 5B shows certain general steps involved in the segmentation of user packets and sequencing of AAL2 packets in accordance with the third mode. FIG. 5C is a flowchart showing certain general steps involved in the reassembly of user packets from AAL2 packets in accordance with the third mode.

FIG. 5A has the same three user data packets as FIG. 3A and FIG. 4A, but renumbered as $500_1$–$500_3$. In FIG. 5A, the user data packets $500_1$ and $500_2$ are put into respective AAL2 packets $502_1$ and $502_2$, and the user data packet $500_3$ (being sufficiently large) is segmented or spread into AAL2 packets $502_{3\text{-}1}$ through and including AAL2 packet $502_{3\text{-}4}$.

In the third mode of the invention, the predetermined value in the length indicator (LI) field serves as a notification that another AAL2 packet of the plural AAL2 packets carries subsequent data belonging to the frame. As the first and second modes, the predetermined value is a value greater than a maximum number of octets in a standard size AAL2 packet. In one example illustrative embodiment, the predetermined value for the third mode is 46.

Illustrative of the foregoing, in the FIG. 5A scenario the AAL2 packets with segmented not concluded user data are AAL2 packet $502_{3\text{-}1}$, AAL2 packet $502_{3\text{-}2}$, and AAL2 packet $502_{3\text{-}3}$. Each of these three AAL2 packets has the predetermined value 46 in its length indicator (LI) field.

In the third mode, a last AAL2 packet of the plural AAL2 packets is detected by having in its length indicator field a value less than or equal to the maximum number of octets in a standard size AAL2 packet. As shown in FIG. 5A, the last or concluding one of the plural AAL2 packets for the user data packet $500_3$, i.e., AAL2 packet $502_{3-4}$, has an actual length value (e.g., 14) in its length indicator (LI) field.

The third mode frees the user-to-user indication (UUI) field in the header of the AAL2 packets, so that the user-to-user indication (UUI) field can serve for other purposes such as sequence number, for example.

FIG. 5B shows certain general steps performed by segmentation subunit SSU for the first mode of the invention. Step S5B-1 shows the segmentation subunit SSU obtaining a next user data packet in anticipation of preparing of mapping the obtained user data into one or more AAL2 packets. At step S5B-2, a determination is made by segmentation subunit SSU where there is too much data in the user data packet to fit into one AAL2 packet.

If it is determined at step S5B-2 that the amount of user data to be processed is not too much for one AAL2 packet, at step S5B-3 an length indicator (LI) field for the AAL2 packet is prepared to have as its contents the actual user data length (e.g., the binary encoded plus one to the payload length).

As optional steps, at step S5B-4 a sequence count maintained by the segmentation subunit SSU is stored in the User-to-User indicator (UUI) field, and at step S5B-5 the sequence count is incremented.

At step S5B-6 the segmentation subunit SSU facilitates creation of the AAL2 packet, and then await a next user data packet for processing (as reflected by step S5B-7).

It will be appreciated with reference to FIG. 5A that the set of steps comprising step S5B-3 through step S5B-7 are performed for the AAL2 packet $502_{3-1}$ and AAL2 packet $502_{3-2}$. In this regard, the AAL2 packet $502_1$ and AAL2 packet $502_2$ each have actual payload length-related values in the length indicator (LI) field. In addition, the set of steps comprising step S5B-3 through step S5B-7 are performed for the AAL2 packet $502_{3-4}$ (after the routine of FIG. 5B has been performed to create AAL2 packet $502_{3-1}$, AAL2 packet $502_{3-2}$, and AAL2 packet $502_{3-3}$).

If it is determined at step S5B-2 that the amount of user data to be processed is too much for one AAL2 packet, at step S5B-8 a length indicator (LI) field for the AAL2 packet is prepared to have as its contents the predetermined value 46, which serves as a notification that another AAL2 packet of the plural AAL2 packets carries subsequent data belonging to the frame.

As optional steps, at step S5B-9 a sequence count maintained by the segmentation subunit SSU is stored in the User-to-User indicator (UUI) field, and at step S5B-10 the sequence count is incremented.

At step S5B-11 the segmentation subunit SSU facilitates creation of the AAL2 packet, and then returns to step S5B-2.

The foregoing procedure described with reference to step S5B-8 through step S5B-11 occurs to create each of the AAL2 packet $502_{3-1}$, AAL2 packet $502_{3-2}$, and AAL2 packet $502_{3-3}$ of FIG. 3A. After the creation of each such AAL2 packet, the segmentation subunit SSU checks back at step S5B-2 to determine if the user data packet obtained at step S5B-1 has too much user data remaining to stuff into a single AAL2 packet. The determination of step S5B-2 is affirmative after the creation of each of AAL2 packet $502_{3-1}$ and AAL2 packet $502_{3-2}$, but is negative after creation of AAL2 packet $502_{3-3}$. After AAL2 packet $502_{3-3}$ has been created, only 15 octets of user data remain, which can be contained in a single AAL2 packet. Therefore, after creation of AAL2 packet $502_{3-3}$, the set of steps comprising step S5B-3 through step S3B-7 are performed (as above explained) for creating AAL2 packet $502_{3-4}$.

Whereas FIG. 5B depicts basic steps performed by a segmentation subunit SSU in connection with preparation of an AAL2 packet for the third mode of the invention, FIG. 5C illustrates basic steps performed by a reassembly subunit RSU for the third mode. The reassembly subunit RSU serves to reassemble user data packets from the AAL2 packets received from another node (as carried by Internet Protocol (IP) packets within link layer packets) over the physical transport means. FIG. 5C shows as step S5C-1 receipt of a next AAL2 packet.

In order to determine whether the received AAL2 packet is an AAL2 packet which carries segmented not concluded user data, a check is made at step S5C-2 whether the contents of the length indicator (LI) field of the received AAL2 packet is not greater than forty five. If the contents of the length indicator (LI) field of the received AAL2 packet is not greater than forty five (as occurs for AAL2 packet $502_1$, AAL2 packet $502_2$, and AAL2 packet $502_{3-4}$, for example), the reassembly subunit RSU realizes that the AAL2 packet does not carry segmented not concluded user data.

In the case of a received AAL2 packet not carrying segmented not concluded user data, at step S5C-3 an optional check is made to ascertain whether the received AAL2 packet is in the proper sequence. Specifically, at step S5C-3 the reassembly subunit RSU ascertains whether the contents of the User-to-User indicator (UUI) field of the received AAL2 packet equals the sequence count maintained by the reassembly subunit RSU. If perchance it is determined at step S5C-3 that the received AAL2 packet is out of order (indicating, e.g., a lost AAL2 packet), then the previously-described out of sequence routine can be performed (step S5C-4). When the optional sequence checking is in effect, at step S5C-5 the reassembly subunit RSU performs the optional step of incrementing the its sequence count.

At step S5C-6 the payload of the received AAL2 packet is processed, after which the reassembly subunit RSU essentially awaits another AAL2 packet (as depicted by step S5C-7).

In the case of a received AAL2 packet carrying segmented not concluded user data, at step S5C-8 a check is made to confirm that the contents of the length indicator (LI) field for the received AAL2 packet is equal to the predetermined length indicator (LI) value for the third mode (e.g., 46 in the illustrated example). If the contents of the length indicator (LI) field is not equal to the predetermined value (e.g., 46), an error is declared at step S5C-9.

At step S5C-10 an optional check is made to ascertain whether the received AAL2 packet is in the proper sequence, similar to the optional check of step S5B-3. Similarly, when the optional sequence checking is in effect, at step S5C-11 the reassembly subunit RSU performs the optional step of incrementing the its sequence count.

At step S5C-6 the payload of the received AAL2 packet is processed, after which the reassembly subunit RSU essentially awaits another AAL2 packet (as depicted by step S5C-7).

EXAMPLE UTRAN IMPLEMENTATION

Figure 6:
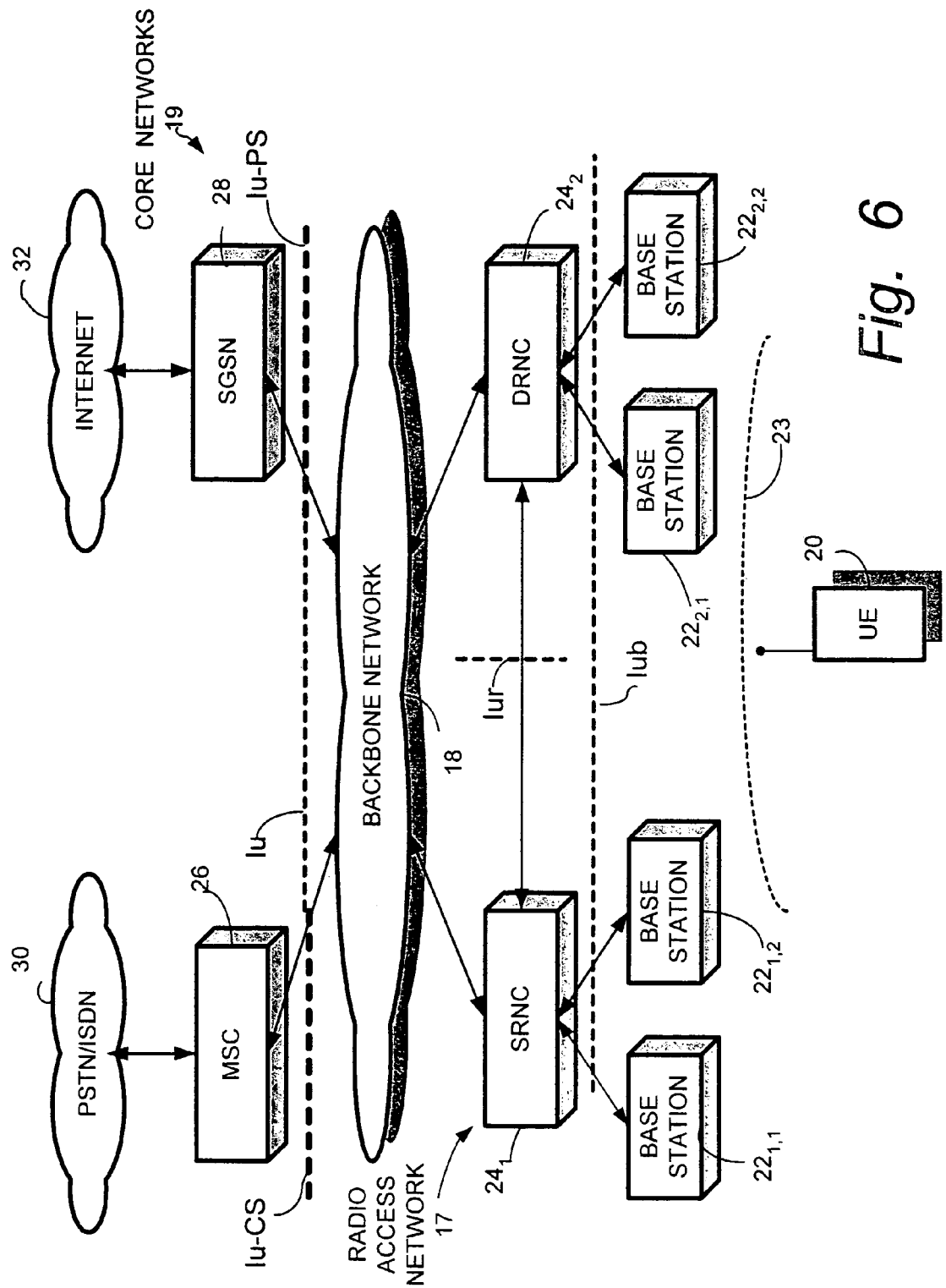
FIG. 6 is diagrammatic view of example mobile communications system in which the present invention may be advantageously employed.

One example, non-limiting deployment of any of the modes of the present invention is in the context of a universal mobile telecommunications system (UMTS) 10 shown in FIG. 6. A representative, connection-oriented, external core network, shown as a cloud 12 may be for example the Public Switched Telephone Network (PSTN) and/or the Integrated Services Digital Network (ISDN). A representative, connectionless-oriented external core network shown as a cloud 14, may be for example the Internet. Both core networks are coupled to their corresponding service nodes 16. The PSTN/ISDN connection-oriented network 12 is connected to a connection-oriented service node shown as a Mobile Switching Center (MSC) node 18 that provides circuit-switched services. The Internet connectionless-oriented network 14 is connected to a General Packet Radio Service (GPRS) node 20 tailored to provide packet-switched type services which is sometimes referred to as the serving GPRS service node (SGSN).

Each of the core network service nodes 18 and 20 connects to a UMTS Terrestrial Radio Access Network (UTRAN) 24 over a radio access network (RAN) interface referred to as the Iu interface. UTRAN 24 includes one or more radio network controllers (RNCs) 26. For sake of simplicity, the UTRAN 24 of FIG. 6 is shown with only two RNC nodes, particularly RNC $26_1$ and RNC $26_2$. Each RNC 26 is connected to a plurality of base stations (BS) 28. For example, and again for sake of simplicity, two base station nodes are shown connected to each RNC 26. In this regard, RNC $26_1$ serves base station $28_{1-1}$ and base station $28_{1-2}$, while RNC $26_2$ serves base station $28_{2-1}$ and base station $28_{2-2}$. It will be appreciated that a different number of base stations can be served by each RNC, and that RNCs need not serve the same number of base stations. Moreover, FIG. 6 shows that an RNC can be connected over an Iur interface to one or more other RNCs in the URAN 24. That is, an interface between radio network controllers (e.g., between a Serving RNC [SRNC] and a Drift RNC [DRNC]) is termed the "Iur" interface.

A user equipment unit (UE), such as user equipment unit (UE) 30 shown in FIG. 6, communicates with one or more base stations (BS) 28. The interface between the user equipment unit (UE) and the base stations is known as the "air interface" or the "radio interface" or "Uu interface". Each of the radio interface 32, the Iu interface, the Iub interface, and the Iur interface are shown by dash-dotted lines in FIG. 6.

Preferably, radio access is based upon wideband, Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality. Each user mobile station or equipment unit (UE) 30 is assigned its own scrambling code in order for a base station 28 to identify transmissions from that particular user equipment unit (UE) as well as for the user equipment unit (UE) to identify transmissions from the base station intended for that user equipment unit (UE) from all of the other transmissions and noise present in the same area.

Other aspects of the universal mobile telecommunications system (UMTS) 10 exemplified by FIG. 6, and in particular the use of Internet Protocol (IP) bearers therein, are understood from U.S. Provisional Patent Application Ser. No. 60/181,083, filed Feb. 8, 2000, entitled USING INTERNET PROTOCOL (IP) IN RADIO ACCESS NETWORK, which is incorporated herein by reference.

The example modes of the present invention can be deployed in several manners in the universal mobile telecommunications system (UMTS) 10 exemplified by FIG. 6.

For example, one of the nodes N of FIG. 1 can be a base station node 22, while the other of the nodes N of FIG. 1 can be a radio access network controller (RNC) node 24. In the BS-RNC deployment, each of the base station node 22 and radio network controller (RNC) node 24 would have an associated segmentation/reassembly unit SRU as shown in FIG. 1, each segmentation/reassembly unit SRU having a segmentation subunit SSU and a reassembly subunit RSU which performs operations similar to those described herein.

Wherever the Internet Protocol (IP) layer is terminated would be considered the IP host and is where the application (like Iub data, for example) is terminated. In the example deployment just described, the destination address in the Internet Protocol (IP) header is for an IP address within the RNC or the base station, as the case may be. There could actually be one IP address per RNC or base station, or more commonly there would be several. A "channel" or flow is identified by the CID in the AAL2 packet hader, the destination UDP port, and the destination IP address. This replaces the CID, and VCC in the ATM world and represents one flow of user data (like Iub data, for example).

AAL2/UDP could be used in any interface in the UTRAN, but likely is most useful on the Iur Interface and the Iub Interface. The modes of the present invention are useful on the Iub Interface since it can comprise a slow link where AAL2 multiplexing and segmentation help use the link bandwidth most efficiently. The application uses the AAL2/UDP for transport. The AAL2 is terminated at the same point where the application is terminated.

As understood from the foregoing and by the person skilled in the art, the Internet Protocol (IP) format involves a header and a payload. Currently, the Internet Protocol (IP) comes in two versions. A first version is Ipv4, wherein a IP packet comprises a header (having 20 octets as minimum length) and a variable payload specified by a total length field in the header. A second version is Ipv6, which differs, e.g., by having a 44 octet header to accommodate more IP addresses. When voice data is to be carried by Internet Protocol (IP), another protocol, known as the User Datagram Protocol (UDP), is contained within the Internet Protocol (IP). The User Datagram Protocol (UDP) comprises a header of 8 octets followed by a payload containing the actual voice packet.

The present invention thus provides techniques for segmentation for AAL2 packets when carried on an Internet Protocol (IP) bearer. The first mode of the invention provides transparency when interworking between ATM-based AAL2 and IP-based AAL2 for segmented data. To add this robustness to AAL2 segmentation is important since some modes in AAL2 segmentation do not have any additional checksum that covers the frame.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, other modes which are variants of the modes above described are possible. In a first such alternate mode, for example, there can be one wrap-around modulo 16 counter which is restarted for the first AAL2 packets of plural AAL2 packets over which user data is segmented. Yet another alternate mode denotes the first AAL2 packet of plural AAL2 packets over which user data is segmented by inserting the value 47 in the length indicator (LI) field and setting the sequence count to zero, with the following AAL2 packet formed from the same user data packet having a value of 48 (the sequence count plus one) its length indicator (LI) field, after which the sequence count is incremented by one.

Moreover, it should be understood with reference to the modes of the invention that AAL2 packets of differing channels (e.g., having differing CIDs) are likely multiplexed into the Internet Protocol (IP) packet stream. For example, in the scenario of FIG. 3A, the AAL2 packet $302_1$ and the AAL2 packet $302_2$ may have differing CID values, and that such CID values for the AAL2 packet $302_1$ and the AAL2 packet $302_2$ may be different than the common CID value assigned for each of AAL2 packet $302_{3\text{-}1}$ through AAL2 packet $302_{3\text{-}4}$. Moreover, one ore more AAL2 packets having non-segmented user data and belong to other channels (e.g., having other CIDs) can be put in between. In fact, even other segmented user data frames using yet other CIDs and having higher priority can be put in between.

What is claimed is:

1. A method of operating a data transmission system comprising:

segmenting a frame of user data for transport by plural AAL2 packets, AAL2 packets being packets of ATM Adaptation Layer 2, ATM being Asynchronous Transfer Mode, each of the plural AAL2 packets having a header which includes a length indicator field;

using one or more Internet Protocol packets to transport the plural AAL2 packets;

using a predetermined value in the length indicator (LI) field in a header of one of the plural AAL2 packets to indicate the frame is transported by plural AAL2 packets;

wherein the predetermined value is one of a range of reserved values for the length indicator field, each value of the range corresponding to a sequence number rather than to a length indication.

2. The method of claim 1, wherein the range comprises numbers which are greater than a maximum number of octets in a standard size AAL2 packet.

3. The method of claim 2, wherein a last AAL2 packet of the plural AAL2 packets is detected by having in its length indicator field a value not greater than the maximum number of octets in a standard size AAL2 packet.

4. The method of claim 1, wherein the range includes at least one value between 48 to 63 inclusive.

5. The method of claim 1, wherein the range extends from 48 to 63 inclusive.

6. The method of claim 1, wherein a modulo division of the predetermined value provides the sequence number.

7. The method of claim 2, wherein a last AAL2 packet of the plural AAL2 packets has in its length indicator field an actual length value of the last AAL2 packet, and wherein contents of a user-to-user indication (UUI) field in the header of the last AAL2 packet can be used to confirm that the last AAL2 packet is in proper sequence.

8. The method of claim 7, wherein the user-to-user indication (UUI) field in the header of the last AAL2 packet has a value Q-E, where Q is the number that would have been used in the length indicator field had the last cell not been the last cell, and wherein E is an endpoint of the range.

9. A method of operating a data transmission system comprising:

segmenting a frame of user data for transport by plural AAL2 packets, AAL2 packets being packets of ATM Adaptation Layer 2, ATM being Asynchronous Transfer Mode, each of the plural AAL2 packets having a header which includes a length indicator field;

using one or more Internet Protocol packets to transport the plural AAL2 packets;

using a predetermined value in the length indicator (LI) field in a header of one of the plural AAL2 packets to indicate the frame is transported by plural AAL2 packets;

wherein the predetermined value belongs to one of two ranges of reserved values for the length indicator field, each value of the two ranges corresponding to a sequence number rather than to a length indication.

10. The method of claim 9, wherein the predetermined value is a value greater than a maximum number of octets in a standard size AAL2 packet.

11. The method of claim 9, wherein when the predetermined value belongs to a first of the two ranges, the predetermined value corresponds to a sequence number for a first of the plural AAL2 packets; and wherein when the predetermined value belongs to a second of the two ranges, the predetermined value corresponds to a sequence number for other than a first of the plural AAL2 packets.

12. The method of claim 11, wherein the first of the two ranges extends from 48 to 55 inclusive, and a second of the two ranges extends from 56 to 63 inclusive.

13. The method of claim 11, wherein a modulo division of the predetermined value provides the sequence number.

14. The method of claim 9, wherein a last AAL2 packet of the plural AAL2 packets has a predetermined end-of-user data packet value in its user-to-user indication (UUI) field of its header.

15. A method of operating a data transmission system comprising:

segmenting a frame of user data for transport by plural AAL2 packets, AAL2 packets being packets of ATM Adaptation Layer 2, ATM being Asynchronous Transfer Mode, each of the plural AAL2 packets hang a header which includes a length indicator field;

using one or more Internet Protocol packets to transport the plural AAL2 packets;

using a predetermined value in the length indicator (LI) field in a header of one of the plural AAL2 packets to indicate the frame is transported by plural AAL2 packets;

wherein the predetermined value serves as a notification that another AAL2 packet of the plural AAL2 packets carries subsequent data belonging to the frame; and wherein the predetermined value is a value greater than a maximum number of octets in a standard size AAL2 packet.

16. The method of claim 15, wherein the predetermined value is 46.

17. The method of claim 15, wherein a last AAL2 packet of the plural AAL2 packets is detected by having in its length indicator field a value not greater than the maximum number of octets in a standard size AAL2 packet.

18. The method of claim 15, wherein a user-to-user indication (UUI) field in the header of the one of the plural AAL2 packets as sequence number.

19. A method of operating a data transmission system comprising:

segmenting a frame of user data for transport by plural AAL2 packets, the AAL2 packets being packets of ATM Adaptation Layer 2, ATM being Asynchronous Transfer Mode, each of the plural AAL2 packets having a header which includes a length indicator field;

using one or more Internet Protocol packets to transport the plural AAL2 packets;

inserting a sequence number-related value in the length indicator (LI) field of a header of all but a last of the plural AAL2 packets.

20. The method of claim 19, wherein the sequence number-related value inserted in all but the last of the plural AAL2 packets is greater than a maximum number of octets in a standard size AAL2 packet.

21. The method of claim 19, wherein the sequence number-related value inserted in all but the last of the plural AAL2 packets is in a range of from 48 to 63 inclusive.

22. The method of claim 19, further comprising:
inserting an actual length value in the length indicator (LI) field of the last of the plural AAL2 packets; and
inserting in a user-to-user indication (UUI) field in the header of the last AAL2 packet a value which can be used to confirm that the last AAL2 packet is in a proper sequence.

23. The method of claim 22, wherein the user-to-user indication (UUI) field in the header of the last AAL2 packet has a value Q-E, where Q is the number that would have been used in the length indicator field had the last cell not been the last cell, and wherein E is an endpoint of the range.

24. The method of claim 19, wherein the sequence number-related value inserted in all but the last of the plural AAL2 packets is selected from one of two ranges of reserved values for the length indicator field.

25. The method of claim 24, wherein for a first of the plural AAL2 packets the sequence number-related value in the length indicator (LI) field belongs to a first of the two ranges, and wherein for all but the first and the last of the plural AAL2 packets the sequence number-related value in the length indicator (LI) field belongs to a second of the two ranges.

26. The method of claim 25, wherein the first of the two ranges extends from 48 to 55 inclusive, and a second of the two ranges extends from 56 to 63 inclusive.

27. A method of operating a data transmission system comprising:
segmenting a frame of user data for transport by plural AAL2 packets, the AAL2 packets being packets of ATM Adaptation Layer 2, ATM being Asynchronous Transfer Mode, each of the plural AAL2 packets having a header which includes a length indicator field;
using one or more Internet Protocol packets to transport the plural AAL2 packets;
inserting a predetermined number in the length indicator (LI) field of a header of all but a last of the plural AAL2 packets, the predetermined number serving as a notification that another AAL2 packet of the plural AAL2 packets carries subsequent data belonging to the frame.

28. The method of claim 27, wherein the predetermined value is a value greater than a maximum number of octets in a standard size AAL2 packet.

29. The method of claim 28, wherein the predetermined value is 46.

30. The method of claim 27, wherein a last AAL2 packet of the plural AAL2 packets is detected by having in its length indicator field a value not greater than the maximum number of octets in a standard size AAL2 packet.

31. The method of claim 27, wherein a user-to-user indication (UUI) field in the header of the one of the plural AAL2 packets as sequence number.

32. A unit of a data transmission system which segments a frame of user data for transport by plural AAL2 packets, AAL2 packets being packets of ATM Adaptation Layer 2, ATM being Asynchronous Transfer Mode, each of the plural AAL2 packets having a header which includes a length indicator field, one or more Internet Protocol packets being used to transport the plural AAL2 packets, wherein the unit inserts a predetermined value in the length indicator (LI) field in a header of one of the plural AAL2 packets to indicate the frame is transported by plural AAL2 packets;
wherein the predetermined value is one of a range of reserved values for the length indicator field, each value of the range corresponding to a sequence number rather than to a length indication.

33. The apparatus of claim 32, wherein the range comprises numbers which are greater than a maximum number of octets in a standard size AAL2 packet.

34. The apparatus of claim 32, wherein the range includes at least one value between 48 to 63 inclusive.

35. The apparatus of claim 32, wherein the range extends from 48 to 63 inclusive.

36. The apparatus of claim 32, wherein a modulo division of the predetermined value provides the sequence number.

37. The apparatus of claim 32, wherein the unit inserts in the length indicator field of a last AAL2 packet of the plural AAL2 packets an actual length value of the last AAL2 packet, and wherein the unit inserts in a user-to-user indication (UUI) field in the header of the last AAL2 packet a value that can be used to confirm that the last AAL2 packet is in a proper sequence.

38. The apparatus of claim 37, wherein the user-to-user indication (UUI) field in the header of the last AAL2 packet has a value Q-E, where Q is the number that would have been used in the length indicator field had the last cell not been the last cell, and wherein E is an endpoint of the range.

39. A unit of a data transmission system which segments a frame of user data for transport by plural AAL2 packets, AAL2 packets being packets of ATM Adaptation Layer 2, ATM being Asynchronous Transfer Mode, each of the plural AAL2 packets having a header which includes a length indicator field, one or more Internet Protocol packets being used to transport the plural AAL2 packets, wherein the unit inserts a predetermined value in the length indicator (LI) field in a header of one of the plural AAL2 packets to indicate the frame is transported by plural AAL2 packets;
wherein the predetermined value belongs to one of two ranges of reserved values for the length indicator field, each value of the two ranges corresponding to a sequence number-related value rather than to a length indication.

40. The apparatus of claim 39, wherein the predetermined value is a value greater than a maximum number of octets in a standard size AAL2 packet.

41. The apparatus of claim 39, wherein when the predetermined value belongs to a first of the two ranges, the predetermined value corresponds to a sequence number for a first of the plural AAL2 packets; and wherein when the predetermined value belongs to a second of the two ranges, the predetermined value corresponds to a sequence number for other than a first of the plural AAL2 packets.

42. The apparatus of claim 39, wherein the first of the two ranges extends from 48 to 55 inclusive, and a second of the two ranges extends from 56 to 63 inclusive.

43. The apparatus of claim 39, wherein a last AAL2 packet of the plural AAL2 packets has a predetermined end-of-user data packet value in its user-to-user indication (UUI) field of its header.

44. A unit of a data transmission system which segments a frame of user data for transport by plural AAL2 packets, AAL2 packets being packets of ATM Adaptation Layer 2, ATM being Asynchronous Transfer Mode, each of the plural AAL2 packets having a header which includes a length indicator field, one or more Internet Protocol packets being used to transport the plural AAL2 packets, wherein the unit inserts a predetermined value in the length indicator (LI) field in a header of one of the plural AAL2 packets to indicate the frame is transported by plural AAL2 packets;
  wherein the predetermined value serves as a notification that another AAL2 packet of the plural AAL2 packets carries subsequent data belonging to the frame; and
  wherein the predetermined value is a value greater than a maximum number of octets in a standard size AAL2 packet.

45. The apparatus of claim 44, wherein the predetermined value is 46.

46. The apparatus of claim 44, wherein the unit inserts a sequence number in a user-to-user indication (UUI) field in the header of the one of the plural AAL2 packets.

47. A unit of a data transmission system which segments a frame of user data for transport by plural AAL2 packets, the AAL2 packets being packets of ATM Adaptation Layer 2, ATM being Asynchronous Transfer Mode, each of the plural AAL2 packets having a header which includes a length indicator field, one or more Internet Protocol packets being used to transport the plural AAL2 packets, and wherein the unit inserts a sequence number-related value in the length indicator (LI) field of a header of all but a last of the plural AAL2 packets.

48. The apparatus of claim 47, wherein the sequence number-related value inserted in all but the last of the plural AAL2 packets is greater than a maximum number of octets in a standard size AAL2 packet.

49. The apparatus of claim 47, wherein the unit inserts the sequence number-related value in a range of from 48 to 63 inclusive.

50. The apparatus of claim 47, wherein the unit inserts an actual length value in the length indicator (LI) field of the last of the plural AAL2 packets; and wherein the unit inserts in a user-to-user indication (UUI) field in the header of the last AAL2 packet a value which can be used to confirm that the last AAL2 packet is in a proper sequence.

51. The apparatus of claim 50, wherein the user-to-user indication (UUI) field in the header of the last AAL2 packet has a value Q-E, where Q is the number that would have been used in the length indicator field had the last cell not been the last cell, and wherein E is an endpoint of the range.

52. The apparatus of claim 47, wherein the sequence number-related value inserted in all but the last of the plural AAL2 packets is selected from one of two ranges of reserved values for the length indicator field.

53. The apparatus of claim 52, wherein for a first of the plural AAL2 packets the sequence number-related value in the length indicator (LI) field belongs to a first of the two ranges, and wherein for all but the first and the last of the plural AAL2 packets the sequence number-related value in the length indicator (LI) field belongs to a second of the two ranges.

54. The apparatus of claim 53, wherein the first of the two ranges extends from 48 to 55 inclusive, and a second of the two ranges extends from 56 to 63 inclusive.

55. A unit of a data transmission system which segments a frame of user data for transport by plural AAL2 packets, the AAL2 packets being packets of ATM Adaptation Layer 2, ATM being Asynchronous Transfer Mode, each of the plural AAL2 packets having a header which includes a length indicator field, one or more Internet Protocol packets being used to transport the plural AAL2 packets; wherein the unit inserts a predetermined number in the length indicator (LI) field of a header of all but a last of the plural AAL2 packets, the predetermined number serving as a notification that another AAL2 packet of the plural AAL2 packets carries subsequent data belonging to the frame.

56. The apparatus of claim 55, wherein the predetermined value is a value greater than a maximum number of octets in a standard size AAL2 packet.

57. The apparatus of claim 56, wherein the predetermined value is 46.

58. The apparatus of claim 55, wherein a user-to-user indication (UUI) field in the header of the one of the plural AAL2 packets as sequence number.

59. A unit of a data transmission system which reassembles a frame of user data which has been segmented into plural AAL2 packets for transport, AAL2 packets being packets of ATM Adaptation Layer 2, ATM being Asynchronous Transfer Mode, each of the plural AAL2 packets having a header which includes a length indicator field, one or more Internet Protocol packets having being used to transport the plural AAL2 packets, wherein the unit uses a predetermined value in the length indicator (LI) field in a header of one of the plural AAL2 packets to detect that the frame is transported by plural AAL2 packets;
  wherein the predetermined value is one of a range of reserved values for the length indicator field, each value of the range corresponding to a sequence number rather than to a length indication.

60. The apparatus of claim 59, wherein the range comprises numbers which are greater than a maximum number of octets in a standard size AAL2 packet.

61. The apparatus of claim 59, wherein the range includes at least one value between 48 to 63 inclusive.

62. The apparatus of claim 59, wherein the range extends from 48 to 63 inclusive.

63. The apparatus of claim 59, wherein a modulo division of the predetermined value provides the sequence number.

64. The apparatus of claim 59, wherein the unit detects in the length indicator field of a last AAL2 packet of the plural AAL2 packets an actual length value of the last AAL2 packet, and wherein the unit detects in a user-to-user indication (UUI) field in the header of the last AAL2 packet a value that can be used to confirm that the last AAL2 packet is in a proper sequence.

65. The apparatus of claim 64, wherein the user-to-user indication (UUI) field in the header of the last AAL2 packet has a value Q-E, where Q is the number that would have been used in the length indicator field had the last cell not been the last cell, and wherein E is an endpoint of the range.

66. A unit of a data transmission system which reassembles a frame of user data which has been segmented into plural AAL2 packets for transport, AAL2 packets being packets of ATM Adaptation Layer 2, ATM being Asynchronous Transfer Mode, each of the plural AAL2 packets having a header which includes a length indicator field, one or more Internet Protocol packets having being used to transport the plural AAL2 packets, wherein the unit uses a predetermined value in the length indicator (LI) field in a header of one of the plural AAL2 packets to detect that the frame is transported by plural AAL2 packets;
  wherein the predetermined value belongs to one of two ranges of reserved values for the length indicator field, each value of the two ranges corresponding to a sequence number rather than to a length indication.

67. The apparatus of claim 66, wherein the predetermined value is a value greater than a maximum number of octets in a standard size AAL2 packet.

68. The apparatus of claim 66, wherein when the predetermined value belongs to a first of the two ranges, the predetermined value corresponds to a sequence number for a first of the plural AAL2 packets; and wherein when the predetermined value belongs to a second of the two ranges, the predetermined value corresponds to a sequence number for other than a first of the plural AAL2 packets.

69. The apparatus of claim 66, wherein the first of the two ranges extends from 48 to 55 inclusive, and a second of the two ranges extends from 56 to 63 inclusive.

70. The apparatus of claim 66, wherein a last AAL2 packet of the plural AAL2 packets has a predetermined end-of-user data packet value in its user-to-user indication (UUI) field of its header.

71. A unit of a data transmission system which reassembles a frame of user data which has been segmented into plural AAL2 packets for transport, AAL2 packets being packets of ATM Adaptation Layer 2, ATM being Asynchronous Transfer Mode, each of the plural AAL2 packets having a header which includes a length indicator field, one or more Internet Protocol packets having being used to transport the plural AAL2 packets, wherein the unit detects a sequence number-related value in the length indicator (LI) field of a header of all but a last of the plural AAL2 packets.

72. The apparatus of claim 71, wherein the sequence number-related value detected in all but the last of the plural AAL2 packets is greater than a maximum number of octets in a standard size AAL2 packet.

73. The apparatus of claim 71, wherein the unit detects the sequence number-related value in a range of from 48 to 63 inclusive.

74. The apparatus of claim 71, wherein the unit detects an actual length value in the length indicator (LI) field of the last of the plural AAL2 packets; and wherein the unit detects in a user-to-user indication (UUI) field in the header of the last AAL2 packet a value which can be used to confirm that the last AAL2 packet is in a proper sequence.

75. The apparatus of claim 74, wherein the user-to-user indication (UUI) field in the header of the last AAL2 packet has a value Q-E, where Q is the number that would have been used in the length indicator field had the last cell not been the last cell, and wherein E is an endpoint of the range.

76. The apparatus of claim 71, wherein the sequence number-related value detected in all but the last of the plural AAL2 packets is in one of two ranges of reserved values for the length indicator field.

77. The apparatus of claim 76, wherein for a first of the plural AAL2 packets the sequence number-related value in the length indicator (LI) field belongs to a first of the two ranges, and wherein for all but the first and the last of the plural AAL2 packets the sequence number-related value in the length indicator (LI) field belongs to a second of the two ranges.

78. The apparatus of claim 77, wherein the first of the two ranges extends from 48 to 55 inclusive, and a second of the two ranges extends from 56 to 63 inclusive.

79. A unit of a data transmission system which reassembles a frame of user data which has been segmented into plural AAL2 packets for transport, AAL2 packets being packets of ATM Adaptation Layer 2, ATM being Asynchronous Transfer Mode, each of the plural AAL2 packets having a header which includes a length indicator field, one or more Internet Protocol packets having being used to transport the plural AAL2 packets, wherein the unit detects a predetermined number in the length indicator (LI) field of a header of all but a last of the plural AAL2 packets, the predetermined number serving as a notification that another AAL2 packet of the plural AAL2 packets carries subsequent data belonging to the frame.

80. The apparatus of claim 79, wherein the predetermined value is a value greater than a maximum number of octets in a standard size AAL2 packet.

81. The apparatus of claim 80, wherein the predetermined value is 46.

82. The apparatus of claim 79, wherein a user-to-user indication (UUI) field in the header of the one of the plural AAL2 packets as sequence number.

83. A data communications network having a first node and a second node, each of the first node and the second node having both a segmentation unit which segments a frame of user data for transport by plural AAL2 packets and a reassembly unit which reassembles a frame of user data which has been segmented into plural AAL2 packets for transport, the AAL2 packets being packets of ATM Adaptation a Layer 2, ATM being Asynchronous Transfer Mode, each of the plural AAL2 packets having a header which includes a length indicator field, one or more Internet Protocol packets being used to transport the plural AAL2 packets between the first node and the second node; wherein:

the segmentation unit inserts a predetermined value in the length indicator (LI) field in a header of one of the plural AAL2 packets to indicate the frame is transported by plural AAL2 packets; and the reassembly unit detects the predetermined value in the length indicator (LI) and handles the one of the plural AAL2 packets as having segmented user data;

wherein the segmentation unit inserts a sequence number-related value in the length indicator (LI) field of a header of all but a last of the plural AAL2 packets; and wherein the sequence number-related value inserted in all but the last of the plural AAL2 packets is greater than a maximum number of octets in a standard size AAL2 packet.

84. The data communication network of claim 83, wherein the segmentation unit inserts an actual length value in the length indicator (LI) field of the last of the plural AAL2 packets; and wherein the unit inserts in a user-to-user indication (UUI) field in the header of the last AAL2 packet a value which can be used to confirm that the last AAL2 packet is in a proper sequence.

85. The data communication network claim 83, wherein the user-to-user indication (UUI) field in the header of the last AAL2 packet has a value Q-E, where Q is the number that would have been used in the length indicator field had the last cell not been the last cell, and wherein E is an endpoint of the range.

86. The data communication of claim 83, wherein the sequence number-related value inserted in all but the last of the plural AAL2 packets is selected from one of two ranges of reserved values for the length indicator field.

87. The data communication network of claim 86, wherein for a first of the plural AAL2 packets the sequence number-related value in the length indicator (LI) field belongs to a first of the two ranges, and wherein for all but the first and the last of the plural AAL2 packets the sequence number-related value in the length indicator (LI) field belongs to a second of the two ranges.

88. The data communication network of claim 86, wherein the first of the two ranges extends from 48 to 55 inclusive, and a second of the two ranges extends from 56 to 63 inclusive.

* * * * *